US012604055B2

(12) United States Patent
Bombach et al.

(10) Patent No.: US 12,604,055 B2
(45) Date of Patent: Apr. 14, 2026

(54) AUTO-REFRAMING AND MULTI-CAM FUNCTIONS OF VIDEO EDITING APPLICATION

(71) Applicant: Apple Inc., Cupertino, CA (US)

(72) Inventors: Paul M Bombach, Seattle, WA (US);
James C Arndt, Livermore, CA (US);
David N Chen, Cupertino, CA (US);
Todd E Kramer, New York, NY (US);
Shaun M Poole, Palo Alto, CA (US);
Rupamay Saha, Cupertino, CA (US);
Eugene M. Walden, San Anselmo, CA (US)

(73) Assignee: Apple Inc., Cupertino, CA (US)

( * ) Notice: Subject to any disclaimer, the term of this patent is extended or adjusted under 35 U.S.C. 154(b) by 391 days.

(21) Appl. No.: 18/314,095

(22) Filed: May 8, 2023

(65) Prior Publication Data

US 2024/0378850 A1     Nov. 14, 2024

Related U.S. Application Data

(60) Provisional application No. 63/500,897, filed on May 8, 2023.

(51) Int. Cl.
| | |
|---|---|
| *H04N 21/431* | (2011.01) |
| *G06F 3/04847* | (2022.01) |

(Continued)

(52) U.S. Cl.
CPC ..... *H04N 21/4312* (2013.01); *G06F 3/04847* (2013.01); *G06F 3/0488* (2013.01); *G06F 3/04883* (2013.01); *G06T 5/70* (2024.01); *G06T 5/73* (2024.01); *G06T 5/92* (2024.01);

*G06T 11/001* (2013.01); *G06V 10/70* (2022.01); *G11B 27/031* (2013.01); *H04N 7/0122* (2013.01);

(Continued)

(58) Field of Classification Search
CPC ................. H04N 21/43; H04N 7/0122; H04N 21/47217; G06V 10/70; G06T 5/73; G06T 5/92; G06T 5/70; G06T 11/001; G06F 3/0487; G06F 3/0488; G06F 3/04883; G11B 27/031
USPC ........................................................ 382/155
See application file for complete search history.

(56) References Cited

U.S. PATENT DOCUMENTS

| | | | |
|---|---|---|---|
| 5,521,841 | A | 5/1996 | Arman et al. |
| 5,758,093 | A | 5/1998 | Boezeman et al. |

(Continued)

*Primary Examiner* — William D Titcomb
(74) *Attorney, Agent, or Firm* — Invoke

(57) ABSTRACT

In one or more embodiments, a computing device is configured to modify an original video by applying a machine learning model. The computing device obtains multiple training data sets, with each particular training data set including an original video and a corresponding modified video. One or more frames from the original video are cropped to generate corresponding frames in the corresponding modified video. The computing device trains a machine learning model, using the training data sets, to generate modified videos from original videos such that one or more frames in the original videos are modified to generate corresponding frames in respective modified videos. Once the machine learning model is trained, the computing device obtains a target original video and applies the trained machine learning model to the target original video to generate a target modified video.

19 Claims, 17 Drawing Sheets

(51) Int. Cl.

| | |
|---|---|
| *G06F 3/0488* | (2022.01) |
| *G06F 3/04883* | (2022.01) |
| *G06T 5/70* | (2024.01) |
| *G06T 5/73* | (2024.01) |
| *G06T 5/92* | (2024.01) |
| *G06T 11/00* | (2006.01) |
| *G06V 10/70* | (2022.01) |
| *G11B 27/031* | (2006.01) |
| *H04N 7/01* | (2006.01) |
| *H04N 21/472* | (2011.01) |

(52) U.S. Cl.

CPC ... *H04N 21/47217* (2013.01); *G06T 2200/24* (2013.01); *G06T 2207/10016* (2013.01)

(56) References Cited

U.S. PATENT DOCUMENTS

| | | | |
|---|---|---|---|
| 5,760,767 A | | 6/1998 | Shore et al. |
| 5,852,435 A | | 12/1998 | Vigneaux et al. |
| 6,332,147 B1 | | 12/2001 | Moran et al. |
| 6,463,444 B1 | | 10/2002 | Jain et al. |
| RE38,401 E | | 1/2004 | Goldberg et al. |
| RE38,609 E | | 10/2004 | Chen et al. |
| 6,807,361 B1 | | 10/2004 | Girgensohn et al. |
| 7,143,362 B2 | | 11/2006 | Dieberger et al. |
| 7,149,974 B2 | | 12/2006 | Girgensohn et al. |
| 7,660,464 B1 | | 2/2010 | Peterson |
| 8,745,499 B2 | | 6/2014 | Pendergast et al. |
| 9,600,164 B2 | | 3/2017 | Matsuda et al. |
| 10,497,162 B2 | | 12/2019 | Kunkel et al. |
| 10,521,671 B2 | * | 12/2019 | Chang ............... H04N 21/8549 |
| 10,937,200 B2 | | 3/2021 | Kumar et al. |
| 11,425,283 B1 | | 8/2022 | Thurston et al. |
| 11,550,452 B1 | | 1/2023 | Fortunato |
| 11,610,606 B1 | * | 3/2023 | Jenni ............... H04N 21/23418 |
| 11,669,567 B2 | | 6/2023 | Klein et al. |
| 11,743,550 B2 | | 8/2023 | Atkins et al. |
| 11,749,312 B2 | * | 9/2023 | Bache ................... G11B 27/34 715/229 |
| 11,887,630 B2 | | 1/2024 | Wu et al. |
| 11,967,011 B2 | * | 4/2024 | Habib ...................... G06T 13/80 |
| 12,112,771 B2 | * | 10/2024 | Jenni ..................... G11B 27/031 |
| 2003/0184598 A1 | | 10/2003 | Graham |
| 2003/0189588 A1 | | 10/2003 | Girgensohn et al. |
| 2005/0084232 A1 | | 4/2005 | Herberger et al. |
| 2006/0093309 A1 | | 5/2006 | Herberger et al. |
| 2014/0267094 A1 | | 9/2014 | Hwang et al. |
| 2015/0077338 A1 | | 3/2015 | Dai et al. |
| 2015/0234564 A1 | | 8/2015 | Snibbe et al. |
| 2015/0268731 A1 | * | 9/2015 | Sanaullah ............ G06F 3/0393 345/156 |
| 2015/0309316 A1 | * | 10/2015 | Osterhout .......... G06F 3/03547 345/8 |
| 2016/0006979 A1 | | 1/2016 | Gilboa-Solomon et al. |
| 2016/0103830 A1 | | 4/2016 | Cheong et al. |
| 2016/0358631 A1 | | 12/2016 | Lee |
| 2017/0352379 A1 | | 12/2017 | Oh et al. |
| 2017/0364198 A1 | | 12/2017 | Yoganandan et al. |
| 2018/0276189 A1 | * | 9/2018 | Bache .................. G11B 27/031 |
| 2019/0114485 A1 | | 4/2019 | Chan et al. |
| 2020/0051260 A1 | * | 2/2020 | Shen ...................... G06N 3/04 |
| 2020/0296317 A1 | | 9/2020 | Post et al. |
| 2021/0004131 A1 | | 1/2021 | Varshney et al. |
| 2021/0099505 A1 | * | 4/2021 | Ravine .................... H04L 65/60 |
| 2021/0173480 A1 | * | 6/2021 | Osterhout ........... G06F 3/04815 |
| 2021/0192355 A1 | * | 6/2021 | Loebl .................. G06N 3/0455 |
| 2021/0272599 A1 | * | 9/2021 | Patterson ............... G06N 3/091 |
| 2022/0028427 A1 | | 1/2022 | Matsuda et al. |
| 2022/0067181 A1 | * | 3/2022 | Carley ................. G06F 18/217 |
| 2022/0327830 A1 | | 10/2022 | Chang et al. |
| 2022/0335720 A1 | | 10/2022 | Chang et al. |
| 2022/0353425 A1 | | 11/2022 | Manzari et al. |
| 2023/0124380 A1 | * | 4/2023 | Goldszmidt .......... G06F 18/217 706/12 |
| 2023/0206476 A1 | * | 6/2023 | Lyu ........................... G06T 7/55 382/294 |
| 2023/0276084 A1 | * | 8/2023 | Jenni ............. H04N 21/234381 725/9 |
| 2023/0281904 A1 | * | 9/2023 | Habib ................ G06F 3/04847 345/473 |
| 2024/0046515 A1 | * | 2/2024 | Adeel ...................... G06V 10/82 |

\* cited by examiner

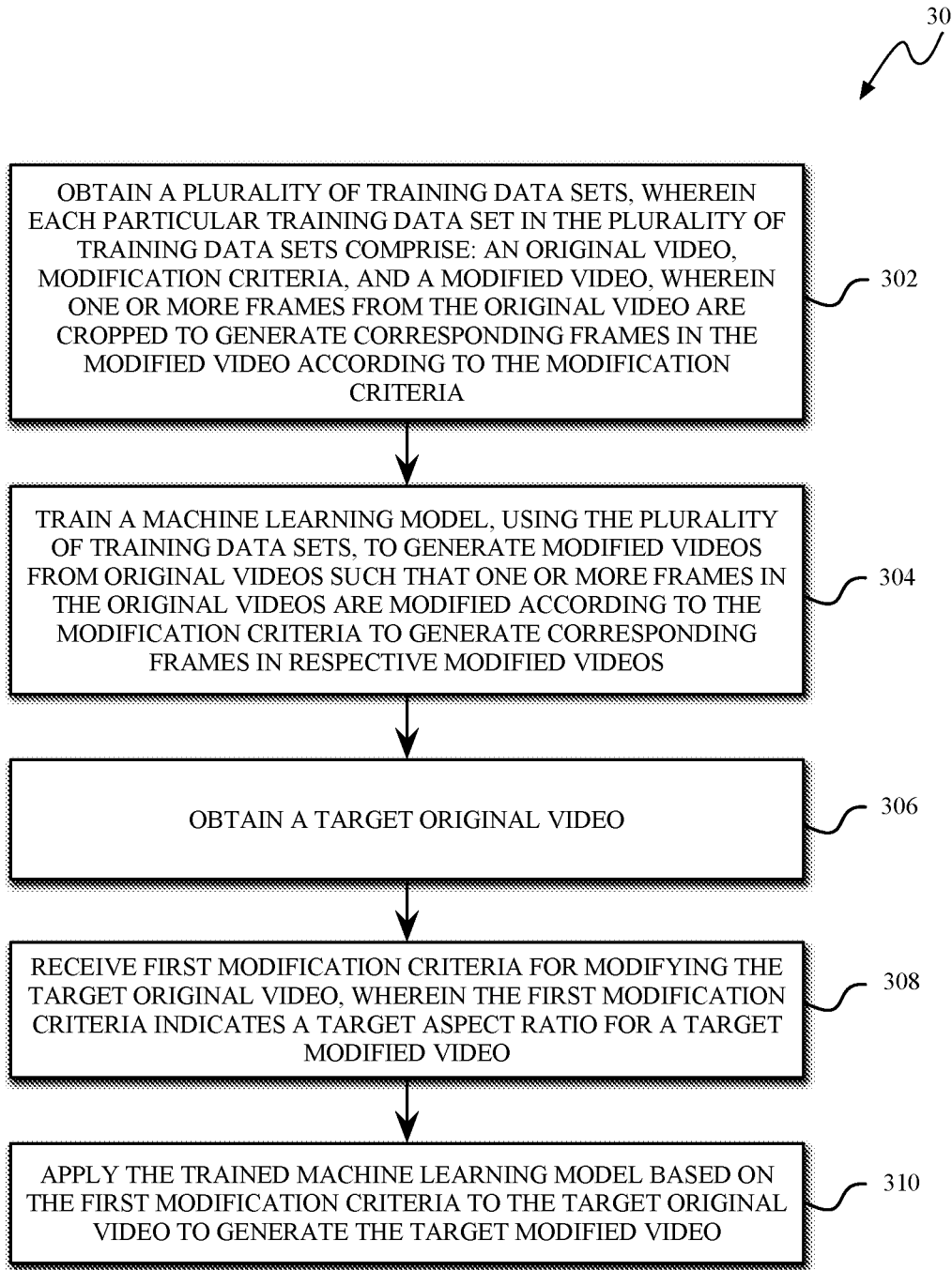

300

OBTAIN A PLURALITY OF TRAINING DATA SETS, WHEREIN EACH PARTICULAR TRAINING DATA SET IN THE PLURALITY OF TRAINING DATA SETS COMPRISE: AN ORIGINAL VIDEO, MODIFICATION CRITERIA, AND A MODIFIED VIDEO, WHEREIN ONE OR MORE FRAMES FROM THE ORIGINAL VIDEO ARE CROPPED TO GENERATE CORRESPONDING FRAMES IN THE MODIFIED VIDEO ACCORDING TO THE MODIFICATION CRITERIA

302

TRAIN A MACHINE LEARNING MODEL, USING THE PLURALITY OF TRAINING DATA SETS, TO GENERATE MODIFIED VIDEOS FROM ORIGINAL VIDEOS SUCH THAT ONE OR MORE FRAMES IN THE ORIGINAL VIDEOS ARE MODIFIED ACCORDING TO THE MODIFICATION CRITERIA TO GENERATE CORRESPONDING FRAMES IN RESPECTIVE MODIFIED VIDEOS

304

OBTAIN A TARGET ORIGINAL VIDEO

306

RECEIVE FIRST MODIFICATION CRITERIA FOR MODIFYING THE TARGET ORIGINAL VIDEO, WHEREIN THE FIRST MODIFICATION CRITERIA INDICATES A TARGET ASPECT RATIO FOR A TARGET MODIFIED VIDEO

308

APPLY THE TRAINED MACHINE LEARNING MODEL BASED ON THE FIRST MODIFICATION CRITERIA TO THE TARGET ORIGINAL VIDEO TO GENERATE THE TARGET MODIFIED VIDEO

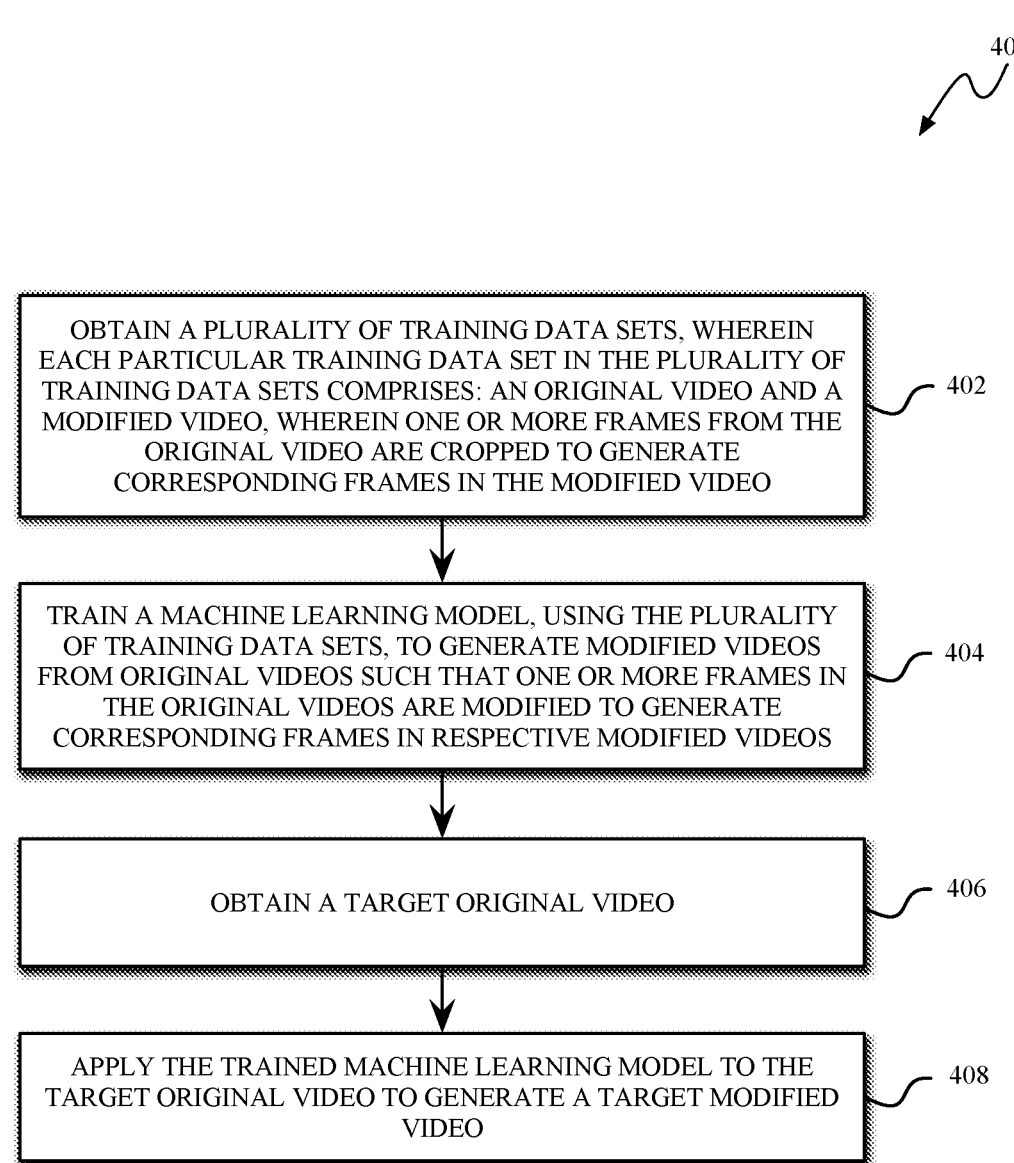

400

OBTAIN A PLURALITY OF TRAINING DATA SETS, WHEREIN EACH PARTICULAR TRAINING DATA SET IN THE PLURALITY OF TRAINING DATA SETS COMPRISES: AN ORIGINAL VIDEO AND A MODIFIED VIDEO, WHEREIN ONE OR MORE FRAMES FROM THE ORIGINAL VIDEO ARE CROPPED TO GENERATE CORRESPONDING FRAMES IN THE MODIFIED VIDEO

402

TRAIN A MACHINE LEARNING MODEL, USING THE PLURALITY OF TRAINING DATA SETS, TO GENERATE MODIFIED VIDEOS FROM ORIGINAL VIDEOS SUCH THAT ONE OR MORE FRAMES IN THE ORIGINAL VIDEOS ARE MODIFIED TO GENERATE CORRESPONDING FRAMES IN RESPECTIVE MODIFIED VIDEOS

404

OBTAIN A TARGET ORIGINAL VIDEO

406

APPLY THE TRAINED MACHINE LEARNING MODEL TO THE TARGET ORIGINAL VIDEO TO GENERATE A TARGET MODIFIED VIDEO

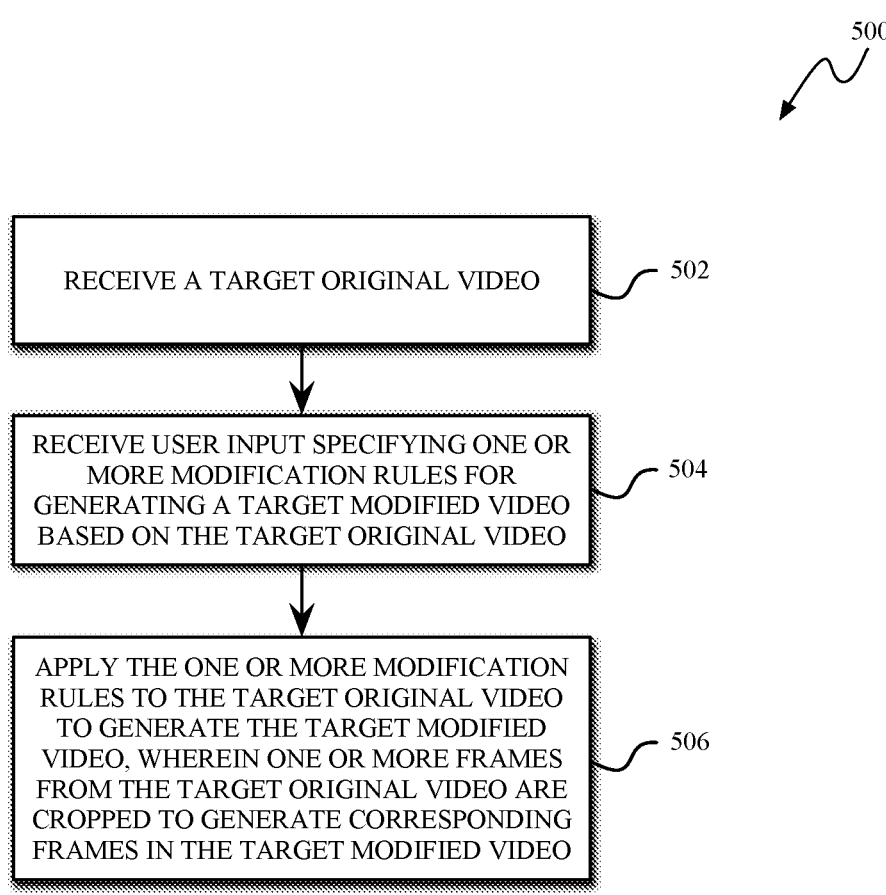

500

RECEIVE A TARGET ORIGINAL VIDEO    502

RECEIVE USER INPUT SPECIFYING ONE OR MORE MODIFICATION RULES FOR GENERATING A TARGET MODIFIED VIDEO BASED ON THE TARGET ORIGINAL VIDEO    504

APPLY THE ONE OR MORE MODIFICATION RULES TO THE TARGET ORIGINAL VIDEO TO GENERATE THE TARGET MODIFIED VIDEO, WHEREIN ONE OR MORE FRAMES FROM THE TARGET ORIGINAL VIDEO ARE CROPPED TO GENERATE CORRESPONDING FRAMES IN THE TARGET MODIFIED VIDEO    506

*FIG. 5*

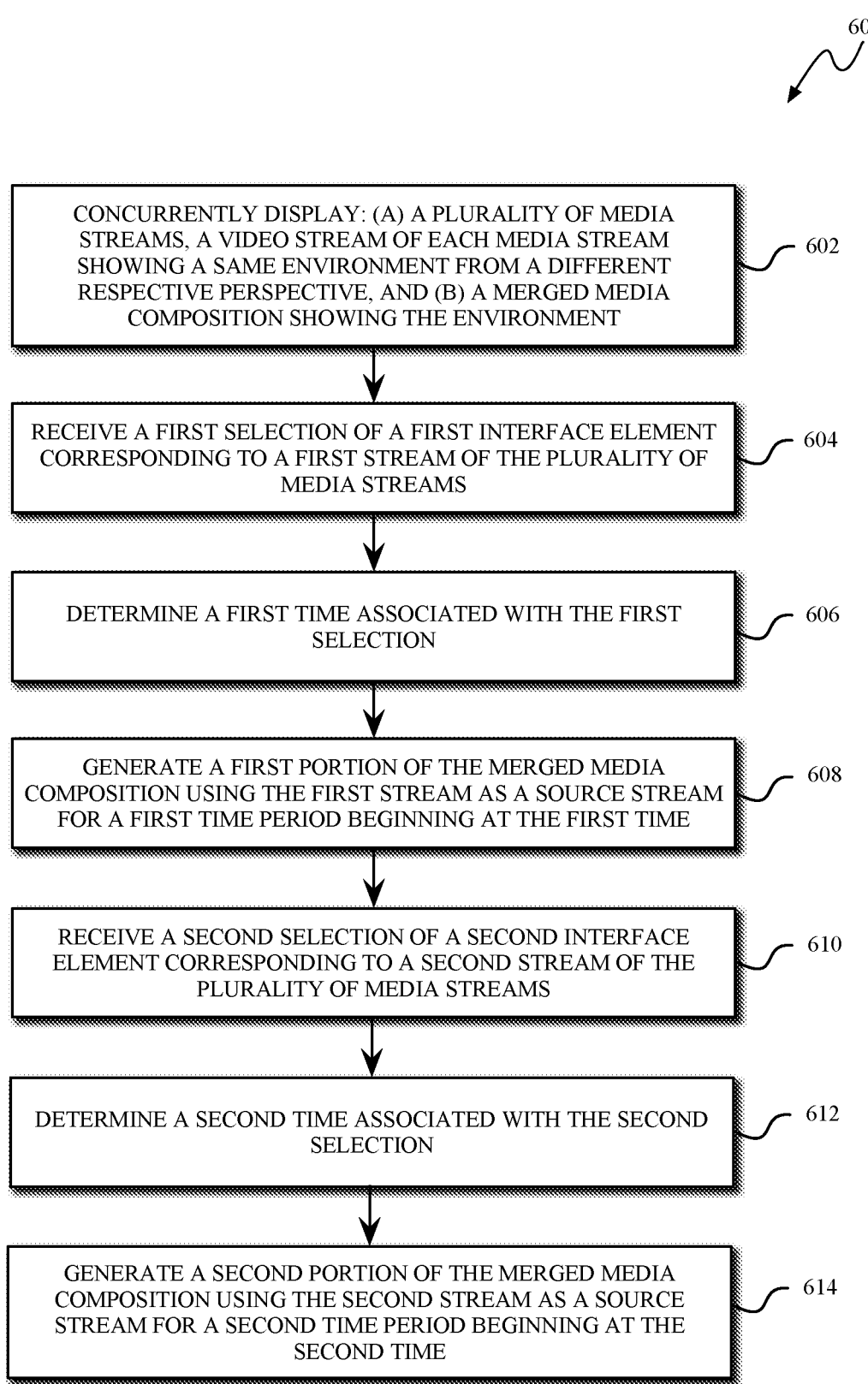

600

CONCURRENTLY DISPLAY: (A) A PLURALITY OF MEDIA STREAMS, A VIDEO STREAM OF EACH MEDIA STREAM SHOWING A SAME ENVIRONMENT FROM A DIFFERENT RESPECTIVE PERSPECTIVE, AND (B) A MERGED MEDIA COMPOSITION SHOWING THE ENVIRONMENT — 602

RECEIVE A FIRST SELECTION OF A FIRST INTERFACE ELEMENT CORRESPONDING TO A FIRST STREAM OF THE PLURALITY OF MEDIA STREAMS — 604

DETERMINE A FIRST TIME ASSOCIATED WITH THE FIRST SELECTION — 606

GENERATE A FIRST PORTION OF THE MERGED MEDIA COMPOSITION USING THE FIRST STREAM AS A SOURCE STREAM FOR A FIRST TIME PERIOD BEGINNING AT THE FIRST TIME — 608

RECEIVE A SECOND SELECTION OF A SECOND INTERFACE ELEMENT CORRESPONDING TO A SECOND STREAM OF THE PLURALITY OF MEDIA STREAMS — 610

DETERMINE A SECOND TIME ASSOCIATED WITH THE SECOND SELECTION — 612

GENERATE A SECOND PORTION OF THE MERGED MEDIA COMPOSITION USING THE SECOND STREAM AS A SOURCE STREAM FOR A SECOND TIME PERIOD BEGINNING AT THE SECOND TIME — 614

*FIG. 6*

AUTO-REFRAMING AND MULTI-CAM FUNCTIONS OF VIDEO EDITING APPLICATION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

INCORPORATION BY REFERENCE; DISCLAIMER

The following application is hereby incorporated by reference: application No. 63/500,897 filed on May 8, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to automatically editing videos, and more specifically to automatically cropping and altering videos using a machine learning model trained to recognize certain aspects of the source videos and generating merged media compositions based on multiple camera angle videos.

BACKGROUND

Video editing and modification on a tablet or slate computer, where user input is often received via a touchscreen display, can be a time consuming and error prone task, even for experienced video editors using expensive and design-built equipment. These issues are exacerbated when standard tablet computing equipment is used by novice and less-experienced users for video editing and modification tasks.

Automated and rules-based video editing, and intuitive user interface design can enable more efficient and effective video editing, particularly when such editing is being performed with user inputs received via a touchscreen display.

OVERVIEW

In some implementations, a computing device is configured to modify an original video by applying a machine learning model. The computing device obtains multiple training data sets, with each particular training data set including an original video and a corresponding modified video. One or more frames from the original video are cropped to generate corresponding frames in the corresponding modified video. The computing device trains a machine learning model, using the training data sets, to generate modified videos from original videos such that one or more frames in the original videos are modified to generate corresponding frames in respective modified videos. Once the machine learning model is trained, the computing device obtains a target original video and applies the trained machine learning model to the target original video to generate a target modified video.

In some implementations, a computing device can concurrently display multiple media streams and a merged media composition. A video stream of each media stream shows a same environment from a different respective perspective, and the merged media composition shows a collection of perspectives of the environment. Through a user interface, the computing device receives selection of a first interface element corresponding to a first stream. Based on this selection, the computing device determines a first time associated with the first selection and generates a first portion of the merged media composition using the first stream as a source stream. The computing device generates the first portion for a first time period beginning at the first time. Also, through the user interface, the computing device receives selection of a second interface element corresponding to a second stream. Based on this selection, the computing device determines a second time associated with the second selection and generates a second portion of the merged media composition using the second stream as a source stream. The computing device generates the second portion for a second time period beginning at the second time.

In one or more embodiments, the computing device can display one or more interface elements that allow for selection of certain portions of a media stream via a touchscreen display, e.g., (a) only an audio stream, (b) only a video stream, and (c) a combined audio-video stream. Through the user interface, the computing device receives selection of an interface element selecting one of: (a) only the audio stream, (b) only the video stream, or (c) the combined audio-video stream. The computing device generates a portion of the merged media composition using only the selected portion of a chosen media stream.

Particular implementations provide at least the following advantages. A user is able to generate modified videos that are intelligently cropped and/or zoomed to show a portion of the source video that is most relevant and/or important for viewing within a common frame size for all source videos, even when the source videos have different aspect ratios and/or zoom factors. Moreover, a user is able to generate a merged media composition of a particular environment using selected portions of source media streams through an intuitive user interface that provides for real time generation of the merged media composition from a set of source media streams that feature the same environment captured form different perspectives.

Details of one or more implementations are set forth in the accompanying drawings and the description below. Other features, aspects, and potential advantages will be apparent from the description and drawings, and from the claims.

DESCRIPTION OF DRAWINGS

FIG. 3 is a flow diagram of an example process for cropping an original video using a machine learning model based on modification criteria.

FIG. 4 is a flow diagram of an example process for modifying an original video using a machine learning model.

FIG. 5 is a flow diagram of an example process for modifying an original video using modification rules.

FIG. 6 is a flow diagram of an example process for generating a merged media composition of a particular environment.

Like reference symbols in the various drawings indicate like elements.

DETAILED DESCRIPTION

Auto-Reframing Using a Machine Learning Model

Figure 1:
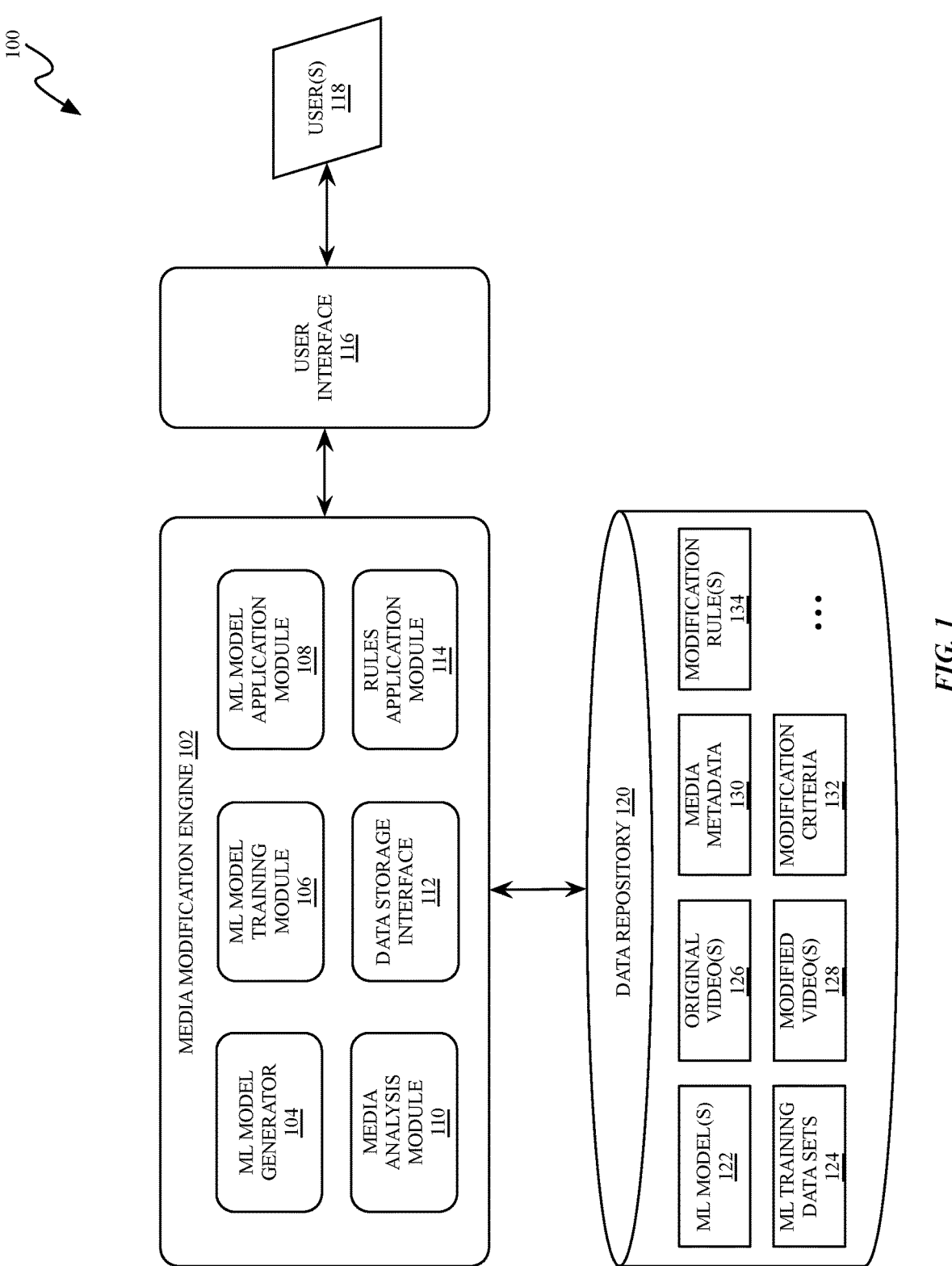
FIG. 1 is a block diagram of an example system for modifying videos using a machine learning model.

FIG. 1 is a block diagram of an example system 100 for modifying videos using a machine learning (ML) model 122. System 100 includes a media modification engine 102 that is electronically coupled to at least one data repository 120. Media modification engine 102 includes a set of modules and/or processes configured for performing one or more function for obtaining, analyzing, generating, and/or modifying videos, which are described below.

In one or more approach, machine learning model generator 104 of the media modification engine 102 is configured to create and/or build one or more machine learning models 122 for use in modifying video content. A machine learning model 104 may be generated to perform one or more predetermined functions, and then trained using training data sets 124 to learn how to perform the predetermined functions in a way that satisfies the programmer and/or user of the media modification engine 102.

For example, if a user wants to change an aspect ratio of videos to match a "target" aspect ratio, the machine learning model generator 104 creates a machine learning model 122 that is configured to adjust an original aspect ratio of an original video to match the target aspect ratio. In another example, if a user wants to normalize the color for a set of videos, the machine learning model generator 104 creates a machine learning model 122 that is configured to adjust color settings of original videos in a certain way that is consistent across each video after modification (e.g., the color values are normalized).

One or more machine learning models 122 and/or machine learning model templates may be stored to the data repository 120, in various approaches. The machine learning models 122 may be generated based on machine learning model templates, and the generated machine learning models 122 may be trained using training data sets 124, and then stored to data repository 120 after training is completed for use in modifying videos.

In one embodiment, media modification engine 102 is configured to obtain multiple training data sets 124. The training data sets 124 may be stored to the data repository 120 in one embodiment, for later use in analysis, training, validation, etc., of one or more machine learning models 122. Each of the training data sets 124 includes, at a minimum, an original video and a modified video. Each original video in a training data set 124 shows video content prior to any manipulation or modification of the video—e.g., it has the original format, aspect ratio, zoom factor (amount of zoom applied to the video), etc., and is used as a baseline to determine what changes are made to the original video to form the corresponding modified video. Each modified video in a training data set 124 has been modified from its original video version in some way. According to one or more embodiments, one or more frames from the original video are cropped and/or zoomed to generate corresponding frames in the respective modified video.

Some example modifications include, but are not limited to, zooming in to focus on one or more target subjects in the original video, cropping an original video to remove blurry, out-of-focus, and/or unwanted material, matching one or more attributes of the original video to certain target attributes (e.g., white balance, color saturation, color levels—e.g., red-blue-green settings, sharpness, brightness, etc.), cropping an original video to adjust an aspect ratio of the video to match a target aspect ratio, etc.

The media analysis module 110 of the media modification engine 102 is configured to analyze the original videos and modified videos from the training data sets 124 to determine what modifications were made to the original video that resulted in the modified video. In a further embodiment, media analysis module 110 may determine corresponding factors associated with and/or attributes of the original video that dictated the modifications to form the modified video. These determined modifications, original videos, and modified videos are then provided to the machine learning model training module 106 for training one or more machine learning models 122 based on the training data sets 124.

Media analysis module 110 may analyze original videos and/or modified videos to determine metadata associated with the videos. In one or more embodiments, media analysis module 110 may store the media metadata 130 in the data repository 120. Some example media metadata 130 includes, but is not limited to, factors and/or attributes of the original videos, author(s), date of creation, date of modification, title, list of actor(s), director, producer, format, size, color levels, brightness, contrast, white balance, color saturation, sharpness, aspect ratio, subject, etc.

In an approach, each particular training data set 124 may further include metadata 130 associated with the original video, the metadata 130 identifying one or more attributes of the original video—e.g., a list of actors in the original video ranked according to screen time and/or priority of importance when viewing the original video, subject(s) of importance in the original video to maintain focus on when modifying the original video, etc. In this approach, the machine learning model 122 is further trained on the metadata 130 included in each particular training data set 124, and the machine learning model 122 learns which roles and/or criteria from the metadata 130 corresponds to what has been included in the modified video, in order to use similar selection techniques for generating a "target" modified video from a "target" original video. The word "target" is used to indicate that these videos are not being used for training the machine learning model, but instead are the input (target original video) and output (target modified video) when the trained machine learning model is applied.

In one or more embodiments, machine learning model training module 106 of the media modification engine 102 is configured to train a machine learning model 122, using the training data sets 124, to generate modified videos from original videos. In one approach, the machine learning model training module 106 trains the machine learning model 122 to modify one or more frames in original videos to generate corresponding frames in respective modified videos. Which modifications are made to the individual frames of the original videos are determined during application of the machine learning model 122 based on the training that has already been performed.

Machine learning model training module 106 may train the machine learning model 122 based on determined modifications and corresponding factors of the original video, in one embodiment, to be able to repeat these modifications when presented with similar original videos and/or original videos that exhibit similar factors and/or attributes.

The machine learning model application module 108 of the media modification engine 102 is configured to apply a machine learning model 110 to an original video to generate a modified video. Media modification engine 102, such as through machine learning model application module 108, may store original video(s) 126, modified video(s) 128, or both to data repository 120 in various approaches. In one or more embodiments, machine learning model application module 108 may choose which machine learning model 122 to apply to an original video based on one or more attributes of the original video and/or one or more modification criteria 132.

Modification criteria 132 may be obtained by media modification engine 102 for use in training one or more machine learning models 122, in an approach. According to some approaches, one or more of the training data sets may include modification criteria 132, and the machine learning model 122 may be trained based further on the modification criteria 132 included in each particular training data set 124. This modification criteria 132 may indicate, in one or more embodiments, a target aspect ratio for the modified video, a source aspect ratio for the original video, a target zoom factor for the modified video, a source zoom factor for the original video, one or more target attributes for the modified video, one or more source attributes for the original video, etc.

According to one embodiment, media analysis module 110 may determine modification criteria 132 associated with one or more training data sets 124. Thereafter, machine learning model training module 106 will train a machine learning model 122 based on the modification criteria 132, and the machine learning model application module 108 will apply the trained machine learning model 122 based on the modification criteria 132. Media modification engine 102, such as using media analysis module 110, may store modification criteria 132 to data repository 120 in various approaches.

Some example modification criteria 132 include, but are not limited to, a target aspect ratio, target white balance, target format, target frame rate, target brightness, target color saturation, target color levels—e.g., red-blue-green settings, target sharpness, target filter to be applied, etc. In addition or alternatively, modification criteria 132 may include source information about the original video prior to modification, including but not limited to a source aspect ratio, source white balance, source format, source frame rate, source brightness, source color saturation, source color levels, source sharpness, source filter that has been applied, etc.

For example, a user may specify that a modified video should have a 16:9 aspect ratio, regardless of the original video's aspect ratio (e.g., 3:2, etc.). In this example, the modified video resulting from application of the trained machine learning model 122 will have an aspect ratio of 16:9, which may include some cropping and/or zooming of the original video to produce the 16:9 aspect ratio of the modified video.

In another example, the user may specify that a modified video should have a zoom factor of 2:1, regardless of the original video's zoom factor (e.g., 1:1, etc.). In this example, the modified video resulting from application of the trained machine learning model 122 will have zoom factor of 2:1, which includes showing a zoomed in portion of the original video to produce the 2:1 zoom factor of the modified video.

Once the machine learning model 122 has been trained, media modification engine 102 may receive a target original video. In one approach, the target original video may be received via a user interface 116 from a user 118.

Machine learning model application module 108 is configured to apply the trained machine learning model 122 to the target original video to generate a target modified video.

According to an embodiment, the target modified video may have a different aspect ratio than the target original video based on applying the trained machine learning model 122 to the target original video.

In one or more embodiments, media modification engine 102 may obtain one or more modification rules 134 for generating a target modified video based on a target original video. In one approach, a target original video may be received in conjunction with user input from a user 118 (such as via user interface 116) specifying one or more modification rules 134 for generating a target modified video based on the target original video. The modification rules 134 may dictate how to modify an original video based on one or more attributes or characteristics of the original video. Moreover, modification rules 134 may dictate one or more types of modification and/or modification styles to apply based on recognizing the one or more attributes or characteristics of the original video.

Some example modification rules 134 include, but are not limited to, convert original aspect ratio from 3:2 to 16:9, harmonize the white balance with a target white balance value, convert original video format to .MOV format, enhance color saturation level to match a target color saturation level, change frame rate to 24 FPS, etc. In addition or alternatively, modification rules 134 may include criteria that the original video must adhere to prior to performing one or more associated actions. For example, an if-then clause may be employed to check for an attribute or characteristic of the original video, and if that attribute or characteristic exists, then perform an associated action.

For example, a modification rule may dictate that the machine learning model 122 change the aspect ratio of any original video that as an aspect ratio of 1:1, 3:2, or 4:3 to an aspect ratio of 16:9. However, this modification rule does not require that the machine learning model 122 change an original aspect ratio of 21:9.

In another example, the user may specify that a modified video should focus on a particular actor when cropping the video to a predetermined size. In this example, the modified video resulting from application of the trained machine learning model 122 will focus on the particular actor when choosing how to crop the video to fit into a designated aspect ratio, while sacrificing other video content that does not include or focus on the particular actor.

In situations where modification rules 134 have been specified, the trained machine learning model 122 applies the one or more modification rules 134 to the target original video to generate the target modified video. In one embodiment, one or more frames from the target original video may be cropped to generate corresponding frames in the target modified video based on application of the one or more modification rules 134.

Media modification engine 102 includes a data storage interface 112 for storing data to data repository 120 and for retrieving data from data repository 120. Data repository 120 may be used to store information and/or data for media modification engine 102 and may be any type of storage unit and/or device (e.g., a file system, database, collection of tables, or any other storage mechanism) for storing data. Further, data repository 120 may include multiple different storage units and/or devices. The multiple different storage units and/or devices may or may not be of the same type or located at the same physical site. Further, data repository 120 may be implemented or may execute on the same computing system as media modification engine 102. Alternatively or additionally, data repository 120 may be implemented or executed on a computing system separate from media modification engine 102. Data repository 120 may be communicatively coupled to any device for transmission and receipt of data via a direct connection or via a network.

Multi-Camera Merged Media Composing

Figure 2:
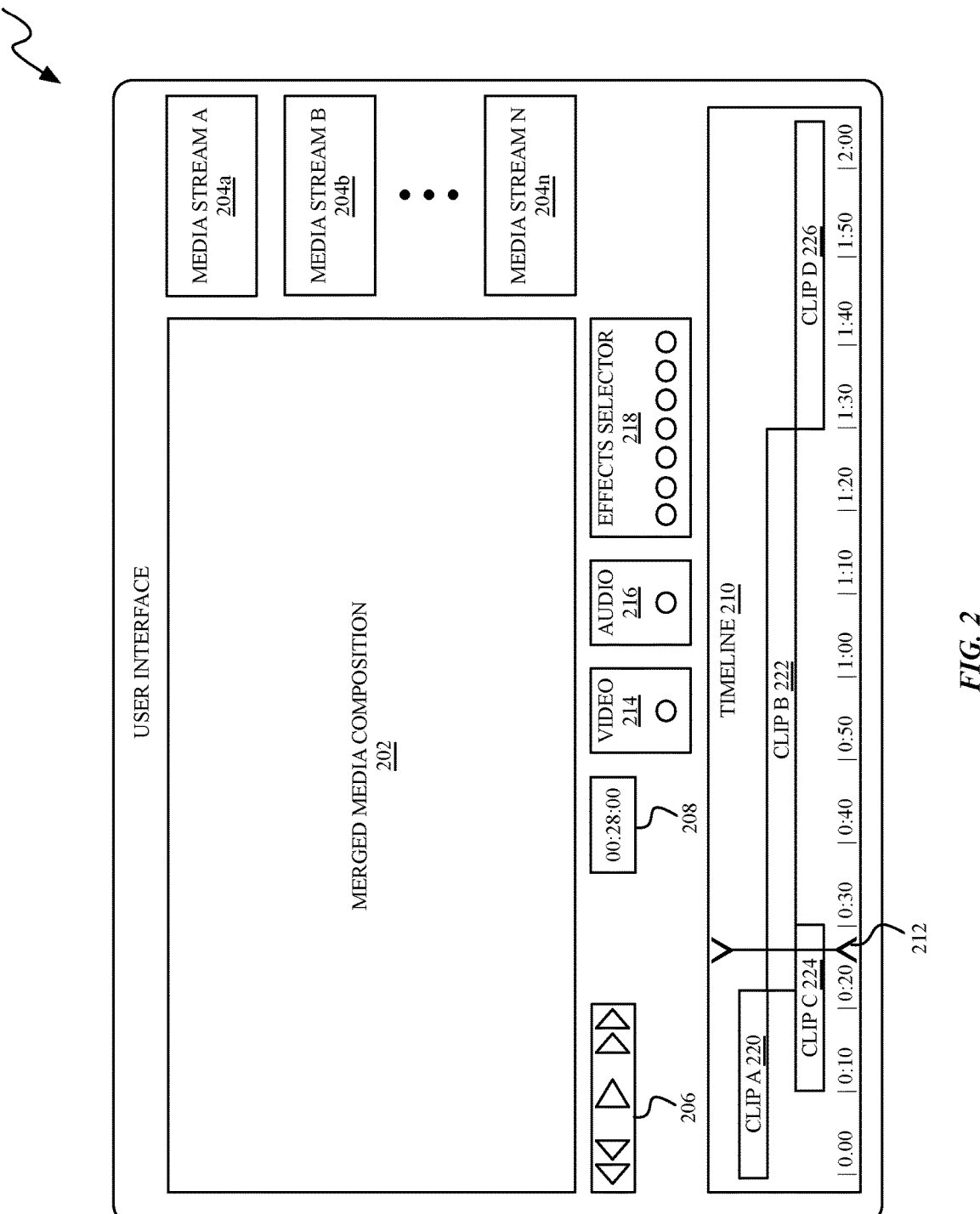
FIG. 2 shows an example user interface for generating a merged media composition.

FIG. 2 shows an example user interface 200 for generating a merged media composition 202 from a set of media streams 204. As shown in this embodiment, user interface 200 concurrently displays a first display area showing the merged media composition 202 and a second display area showing the set of media streams 204 (e.g., media stream A 204a, media stream B, 204b, . . . , media stream N 204n) from which a user can select, via a touchscreen display, media content to add to the merged media composition 202.

In an approach, a video stream of each media stream 204 shows a same environment from a different respective perspective. User interface 200 allows for a user to select a particular media stream 204 from which to add media content to the merged media composition 202 in real-time or after the media streams 204 have been created. For example, multiple television cameras may be used to record a football game, and each of these television cameras will provide a media stream of the football game from a unique perspective associated with placement of the respective television camera around the stadium where the football game is being played.

In one embodiment, user interface 200 also includes a timeline 210 for easy manipulation of the current playback time by adjusting a position of the playback head indicator 212 along a timescale. The timeline 210 further displays how the merged media composition 202 has been assembled from the various media streams 204 by showing each media clip within the merged media composition 202 positioned along the timeline from a starting time to an ending time for the respective media clip. Moreover, each of these clips may be movable along the timeline, such as by a drag-and-drop touch input via a touchscreen display, to reposition the clips within the merged media composition.

For example, clip A 220 starts at time 0:00 and ends at time 0:21 (a span of 21 seconds), clip B 222 starts at time 0:21 and ends at time 1:30 (a span of 69 seconds), clip C 224 starts at time 0:10 and ends at time 0:30 (a span of 20 seconds), and clip D 226 starts at time 1:30 and may extend beyond the current timescale shown on the timeline 210.

The actual media content of clip A 220, clip B 222, clip C 224, and clip D 226 may have originated from any of the various media streams 204 available in user interface 200, in one or more embodiments. Moreover, based upon how the video selection interface element 214 and/or audio selection interface element 216 were utilized when adding clips A-D to the merged media composition 202, any of the clips may represent audio or video only portions from one of the media streams 204.

In one embodiment, display of each of the media streams 204 and the merged media composition 202 are time-synchronized to a time associated with the playhead indicator 212 movable along the timeline 210. In other words, all media streams 204 and the merged media composition 202 are displayed concurrently at the same time of playback based on the position of the playhead indicator 212 along the timeline 210.

The system may temporally synchronize media streams 204 and/or media clips in merged media composition 202 using any known method, methods contemplated herein, and future methods to be developed. Temporal synchronization may include determining exact matches or fuzzy matches between corresponding frames of two or more media streams 204 and/or media clips in merged media composition 202. In an example, audio characteristics such as extreme high/low pitches, shared background noises, beginning/ending of speech, etc., may be used to identify exact or fuzzy matches between different media clips. The temporal synchronization may involve identifying an exact or fuzzy match for n number of frames of different media clips. A temporal synchronization may involve pairing frames of different media clips such that the frames of one media clip generate the corresponding frames of another media clip via application of a same function or adjustment.

Known methods for temporal synchronization, such as those described in Kammerl et al., "Temporal Synchronization of Multiple Audio Signals," Proceedings of the International Conference on Acoustics, Speech, and Signal Processing (ICASSP), Florence, Italy 2014 are hereby incorporated by reference.

User interface 200, in some approaches, may include playback controls 206, which may include selectable graphical elements for controlling playback of the merged media composition 202 after creation of a portion thereof, such as play, pause, stop, skip ahead, skip back, etc. In one approach, user interface 200 may be implemented on a touchscreen display, and user input to the playback controls 206 may be received via finger touch input, stylus touch input, and/or hover input where a user hovers close to the touchscreen display but does not actually contact the touchscreen display, which may cause a different action to be taken versus a touch contact. Moreover, swipe inputs and multiple tap inputs may also be received via the touchscreen display and may result in different actions to be taken versus a single touch contact.

User interface 200, in some approaches, may include a time indicator 208 that shows the current time of playback for the merged media composition 202. This time indicator 208 may be synchronized with a playback head indicator 212 shown in the timeline 210. In some embodiments, the time indicator 208 may be selectable to change the time that is displayed by the time indictor 208 between an elapsed time, a remaining time, a total time, a time associated with a certain media clip, etc.

In an embodiment, user interface 200 may include one or more interface elements 214, 216 for selection of a portion of a currently selected media stream 204 to add to the merged media composition 202. As shown, user interface 200 includes a video selection interface element 214 that allows for user selection of a video portion of a media stream 204, an audio selection interface element 216 that allows for user selection of an audio portion of a media stream 204, while selection of both interface elements 214, 216 results in selection of a combined audio-video stream.

According to an embodiment, user interface 200 may include an effects selector 218 which allows for application of one or more effects to a selected media stream 204 as the selected media stream 204 is added to the merged media composition 202. Some example effects that can be applied to the source media stream include, but are not limited to, altering the speed (e.g., slow-motion or fast-motion), filter application (e.g., blur, black-and-white, drawing effect, color enhancing, color altering or reversal, sharpening, softening, etc.), sound manipulation (e.g., enhancing the sound, amplifying sounds within a selected range, deadening sounds within a selected range, loudness alteration, etc.), jitter reduction, motion smoothing, unwanted object removal etc.

User interface 200 allows for a user to make a first selection of a first interface element corresponding to a first media stream (e.g., selecting media stream A 204a from amongst the set of media streams 204). Each media stream 204 displayed in user interface 200 not only shows the media stream at a current time indicated by the playhead indictor 212 along the timeline 210, but the displayed media stream 204 is also a selectable graphical element, with one or more portions of a media stream being selectable at any given time.

Upon selection of media stream A 204a, the system determines a start time associated with the selection of media stream A 204a. In other words, when a user selects media stream A 204a, the system determines a current playback time associated with playhead indicator 212 along timeline 210. At this point, the system generates a portion of the merged media composition 202 using media stream A 204a as a source stream for a time period beginning at the start time when selection of media stream A 204a was made by the user. Merged media composition 202 will be generated based on the media content of media stream A 204a for as long as no further selections are made by the user.

However, once the user selects another media stream 204 (e.g., the user selects media stream B 204b), the system will use media content from the selected media stream to generate the merged media composition 202 starting at the time of the next selection. To this end, the system determines a start time associated with selection of media stream B 204b and generates another portion of the merged media composition 202 using media stream B 204b as a source stream for a subsequent time period beginning at the start time associated with selection of media stream B 204b.

A user may manipulate playhead indicator 212 to revisit portions of the merged media composition 202 that have already been generated to add and/or replace media content. This may be performed by selecting another media stream 204 and choosing which portion of the media stream to use via video selection interface element 214 and/or audio selection interface element 216 to choose the portion of the newly selected media stream to add to the merged media composition 202 (which may replace another media portion already existing in the merged media composition 202 for the selected time frame). Only the selected portion of the media stream 204 will be added to the merged media composition 202 for a time period beginning at a start time associated with selection of the newly selected media stream (e.g., only the audio stream, only the video stream, or the combined audio-video stream).

According to one approach, to ensure that each media stream 204 is time-synchronized while being displayed in user interface 200, prior to concurrently displaying the set of media streams 204 and the merged media composition 202, the system identifies an audio portion of each of the set of media streams 204 and time-synchronizes the set of media streams 204 and current playback of the merged media composition 202 based on a comparison of the audio portion of each of the set of the media streams 204 and the audio portion of the merged media composition 202.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

FIG. 3 is a flow diagram of an example process 300 for cropping an original video using a machine learning model based on modification criteria. More or less operations than those shown and described herein may be included in process 300 in various approaches. For the remainder of the description of FIG. 3, process 300 will be described as being performed by a computing device having at least one hardware processor for performing the various operations.

In operation 302, the computing device obtains a plurality of training data sets tailored for training a machine learning model to perform certain modifications to original videos. These modifications result in a modified video being generated upon application of the machine learning model on the original video. Each particular training data set includes an original video, modification criteria, and a modified video. In the modified video, one or more frames from the original video are cropped and/or zoomed to generate corresponding frames in the modified video according to the modification criteria.

In operation 304, the computing device trains a machine learning model, using the training data sets and the modification criteria included in each particular training data set, to generate modified videos from original videos. This training is performed to teach the machine learning model how to modify one or more frames in the original videos, according to the modification criteria, to generate corresponding frames in respective modified videos.

Modification criteria may be obtained by the computing device for use in training the machine learning model, in an approach. The modification criteria may indicate, in one or more embodiments, a target aspect ratio for the modified video, a source aspect ratio for the original video, a target zoom factor for the modified video, a source zoom factor for the original video, one or more target attributes for the modified video, one or more source attributes for the original video, etc.

Some example modification criteria include, but are not limited to, a target aspect ratio, target white balance, target format, target frame rate, target brightness, target color saturation, target color levels, target sharpness, target filter to be applied, etc. In addition or alternatively, modification criteria may include source information about the original video prior to modification, including but not limited to a source aspect ratio, source white balance, source format, source frame rate, source brightness, source color saturation, source color levels, source sharpness, source filter that has been applied, etc.

In operation 306, the computing device obtains a target original video. The target original video may be submitted by a user via a user interface, in one embodiment. According to an approach, a library of original videos may be accessible by the computing device (such as via cloud or remote storage devices), and a filter may be applied to the available original videos to determine possible candidate videos for modification by the computing device based on some filtering criteria.

In operation 308, the computing device obtains modification criteria for modifying the target original video. The modification criteria for modifying the target original video may be submitted by the user via the user interface separate from or in addition to providing the target original video, in several embodiments.

In one embodiment, the modification criteria for modifying the target original video indicates a target aspect ratio for generating the target modified video. In a further embodiment, the modification criteria for modifying the target original video may further indicate a source aspect ratio for the target original video.

In operation 310, the computing device applies the trained machine learning model to the target original video, based on the modification criteria, to generate a target modified video. In the embodiment where the modification criteria includes the target aspect ratio, the target modified video will have the target aspect ratio.

FIG. 4 is a flow diagram of an example process 400 for modifying an original video using a machine learning model. More or less operations than those shown and described herein may be included in process 400 in various approaches. For the remainder of the description of FIG. 4, process 400 will be described as being performed by a computing device having at least one hardware processor for performing the various operations.

In operation 402, the computing device obtains a plurality of training data sets. Each particular training data set includes, at a minimum, an original video and a modified video that has had one or more frames generated from frames of the original video that have been cropped.

In operation 404, the computing device trains a machine learning model, using the training data sets, to generate modified videos from original videos, so that the modified videos generated by the machine learning model have one or more frames that have been generated from frames of the original videos according to a modification learned from the training data sets.

In operation 406, the computing device obtains a target original video, which represents the starting point for creating a target modified video in accordance with the techniques learned during training of the machine learning model.

In operation 408, the computing device applies the trained machine learning model to the target original video to generate a target modified video.

In an embodiment, each particular training data set may further include modification criteria, which dictates how and why original videos are modified to form modified videos. In this embodiment, the computing device trains the machine learning model on the modification criteria included in each particular training data set so that the machine learning model can duplicate the effects seen from the modified videos with insight of the modification criteria employed.

In a particular embodiment, the computing device may receive a first set of modification criteria for modifying the target original video that has been obtained by the computing device. In this case, the computing device may apply the trained machine learning model to the target original video based on the first modification criteria, to generate the target modified video (which will be modified in accordance with the modification criteria).

In several approaches, the first modification criteria may indicate a target aspect ratio for the target modified video, a source aspect ratio for the target original video, a target white balance, target format, target frame rate, target brightness, target color saturation, target color levels, target sharpness, target filter to be applied, source white balance, source format, source frame rate, source brightness, source color saturation, source color levels, source sharpness, source filter that has been applied, etc.

In an embodiment, each particular training data set may also include metadata associated with the original video. The metadata identifies one or more attributes of the original video. Some example attributes include, but are not limited to, a list of actors in the original video ranked according to screen time/priority of display, subject(s) of importance in the original video to maintain focus on when modifying the original video, etc. In this case, the computing device trains the machine learning model based on the metadata included in each particular training data set to be able to recognize attributes of the original videos that lead to certain modifications in the modified videos. In other words, the machine learning model learns which roles and/or criteria from the metadata correspond to what has been included in the modified video and uses similar selection techniques for modifying original videos.

In a further embodiment, the computing device may receive first metadata associated with the target original video that has been obtained by the computing device, and the trained machine learning model is applied to the target original video based on the first metadata associated with the target original video.

In a specific embodiment, the target modified video has a different aspect ratio than the target original video based on applying the trained machine learning model to the target original video.

FIG. 5 is a flow diagram of an example process 500 for modifying an original video using modification rules. More or less operations than those shown and described herein may be included in process 500 in various approaches. For the remainder of the description of FIG. 5, process 500 will be described as being performed by a computing device having at least one hardware processor for performing the various operations.

In operation 502, the computing device receives, obtains, or otherwise acquires a target original video. The target original video may have metadata associated therewith in an embodiment. In one approach, a set of modification criteria may be obtained by the computing device, which will dictate modifications to be made to the target original video.

In operation 504, the computing device receives user input specifying one or more modification rules for generating a target modified video based on the target original video. The user input may be received via a user interface along with or separately from the target original video. Modification rules may dictate how the target original video is to be modified. Moreover, modification rules may dictate one or more types of modification and/or modification styles to apply based on recognizing the one or more attributes or characteristics of the original video.

Some example modification rules include, but are not limited to, convert original aspect ratio from 3:2 to 16:9, harmonize the white balance with a target white balance value, convert original video format to .MOV format, enhance color saturation level to match a target color saturation level, change frame rate to 24 FPS, etc. In addition or alternatively, modification rules may include criteria that the original video must adhere to prior to performing one or more associated actions. For example, an if-then clause may be employed to check for an attribute or characteristic of the original video, and if that attribute or characteristic exists, then perform an associated action.

In one approach, the modification rules may explicitly specify a subject to focus on, e.g., an actor, action taking place in a particular shot, object in the foreground or background, etc.

For example, a modification rule may dictate that the machine learning model change the aspect ratio of any original video that as an aspect ratio of 1:1, 3:2, or 4:3 to an aspect ratio of 16:9. However, this modification rule does not stipulate that the machine learning model change an original aspect ratio of 21:9 to any other aspect ratio.

In another example, the user may specify that a modified video should focus on a particular actor when cropping the video to a predetermined size. In this example, the modified video resulting from application of the trained machine learning model will focus on the particular actor when choosing how to crop the video to fit into a designated aspect ratio, while sacrificing other video content that does not include or focus on the particular actor.

In situations where modification rules have been specified and a machine learning model is used to modify the original videos, the machine learning model may apply the one or more modification rules to the target original video to generate the target modified video. In one embodiment, one or more frames from the target original video may be cropped to generate corresponding frames in the target modified video based on application of the one or more modification rules.

In operation 506, the computing device applies the one or more modification rules to the target original video to generate the target modified video. In the case where a machine learning model is also present on the computing device for modifying original videos, the machine learning model may adhere to the modification rules when modifying the target original video to generate the target modified video.

In one embodiment, one or more frames from the target original video may be cropped to generate corresponding frames in the target modified video.

FIG. 6 is a flow diagram of an example process 600 for generating a merged media composition of a particular environment. More or less operations than those shown and described herein may be included in process 600 in various approaches. For the remainder of the description of FIG. 6, process 600 will be described as being performed by a computing device having at least one hardware processor for performing the various operations.

In operation 602, the computing device concurrently displays to a touchscreen display: (a) a set of media streams and (b) a merged media composition showing the same environment that is shown in a video stream of each of the set of media streams from different respective perspectives.

In operation 604, the computing device receives selection of a first interface element corresponding to a first stream via the touchscreen display. Each of the various media streams are displayed on the user interface, and a user may select one of the streams by touching the displayed media stream on the touchscreen display, tapping the displayed media stream using a stylus, hovering over the displayed media stream for a predetermined amount of time, or otherwise selecting the media stream from amongst all media streams displayed (or not displayed) to the user interface. Various media streams may be sorted through before and after determining a particular media stream to select for addition to the merged media composition.

In operation 606, the computing device determines a time associated with the selection of the first interface element corresponding to the first stream. This time may be determined from a clock of the computing device, received when the selection is made, determined based on the position of a playback head indicator along a timeline representing the merged media composition, or acquired in any other fashion.

In operation 608, the computing device generates a first portion of the merged media composition using the first stream as a source stream for a first time period beginning at the time associated with the selection of the first interface element corresponding to the first stream. In one embodiment, the first time period will continue until the user either indicates to stop or cancel selection of the first stream or the user indicates selection of a different stream from the set of media streams.

The generated portion of the merged media composition will obtain frames from the selected first stream as the source content that is then stored to the merged media composition for the full extent of the first time period. This operation may be indicated, on a timeline, as a media clip that extends from the time associated with the selection of the first interface element corresponding to the first stream and ends at a time corresponding to either (a) the user's indication to stop or cancel selection of the first stream, or (b) the user's selection of a different stream from the set of media streams.

Once the generated portion is complete, the media clip shown on the timeline may be moved, clipped, expanded, or otherwise manipulated via user interaction with the touchscreen display, to further modify the merged media composition.

In operation 610, the computing device receives selection of a second interface element corresponding to a second stream.

In operation 612, the computing device determines a time associated with the selection of the second interface element corresponding to the second stream. In a further approach, the first time period ends at the time associated with the selection of the second interface element corresponding to the second stream.

In operation 614, the computing device generates a second portion of the merged media composition using the second stream as a source stream for a second time period beginning at the time associated with selection of the second interface element corresponding to the second stream.

In a further approach, the computing device may receive selection of a third interface element corresponding to an audio portion of a third stream of the set of media streams. In this case, the computing device determines a time associated with the selection of the third interface element corresponding to the audio portion of the third stream and generates a third portion of the merged media composition for a third time period beginning at the time associated with the selection of the third interface element corresponding to the audio portion of the third stream. When this selection is made after the selection of the second stream, the third portion of the merged media composition is generated by the computing device using: (a) a video portion of the second stream, and (b) the audio portion of the third stream.

In several embodiments, the merged media composition has a video component and an audio component, and addition of each of these audio/video components may be from the same media stream or different media streams during any particular time period. Moreover, a user may change the source stream to provide one or both of the audio/video components on-the-fly during generation of the merged media composition.

In one embodiment, the computing device may display, to the touchscreen display, one or more interface elements that allow for selection of: (a) only an audio stream, (b) only a video stream, and (c) a combined audio-video stream. These interface elements may be in a drop-down menu, radio buttons, one or more sliders, switches, or any other graphical element configured to allow selection of A/V portions of a media stream.

In a further embodiment, the computing device may receive selection of at least one of the interface elements, which indicates selection of: (a) only the audio stream, (b) only the video stream, or (c) the combined audio-video stream. In association with receiving this selection, the computing device may receive selection of a third stream of the set of media streams and determine a time associated with the selection of the third stream. Based on the time associated with the selection of the third stream, the computing device may generate a portion of the merged media composition using a selected portion of the third stream as a source stream for the merged media composition for a time period beginning at the time associated with the selection of the third stream. The selected portion corresponds to one of: (a) only the audio stream, (b) only the video stream, or (c) the combined audio-video stream, depending on which was selected by the user.

In one approach, the user may select the interface element representing the desired media stream, and then select an interface element that specifies which portion of the selected media stream to utilize, i.e., stream-specific audio, stream-specific video, or stream-specific audio/video.

In another approach, an overall selection may be utilized, where interface elements indicating which portion of a media stream will be utilized are selected and displayed. Any subsequent selection of a media stream to add content to the merged media composition will result only the selected portion being used.

In one embodiment, user interface may include a timeline for easy manipulation of the current playback time by adjusting a position of a playback head indicator along a timescale. The timeline displays how the merged media composition has been assembled from the various media streams by showing each media clip within the merged media composition positioned along the timeline from a starting time to an ending time for the respective media clip. Moreover, each of these clips may be movable along the timeline, such as by a drag-and-drop touch input via a touchscreen display, to reposition the clips within the merged media composition.

In one embodiment, display of each of the media streams and the merged media composition are time-synchronized to a time associated with the playhead indicator movable along the timeline. In other words, all media streams and the merged media composition are displayed concurrently at the same time of playback based on the position of the playhead indicator along the timeline.

In one approach, prior to concurrently displaying (a) the set of media streams and (b) the merged media composition, the computing device may identify an audio portion of each of the plurality of media streams and time-synchronize the media streams based on a comparison of the audio portion of each of the media streams, along with displaying the merged media composition time-synchronized to position of each of the media streams once it has any portion generated.

In one embodiment, when no video portion is present for a particular time period, the merged media composition may be displayed as a blank or all black screen. In another embodiment, when no audio portion is present for a particular time period, the merged media composition may be played back with no audio.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

FIGS. 7A-7F show example user interfaces for cropping an original video using a machine learning model, in one or more embodiments.

Figure 7A:
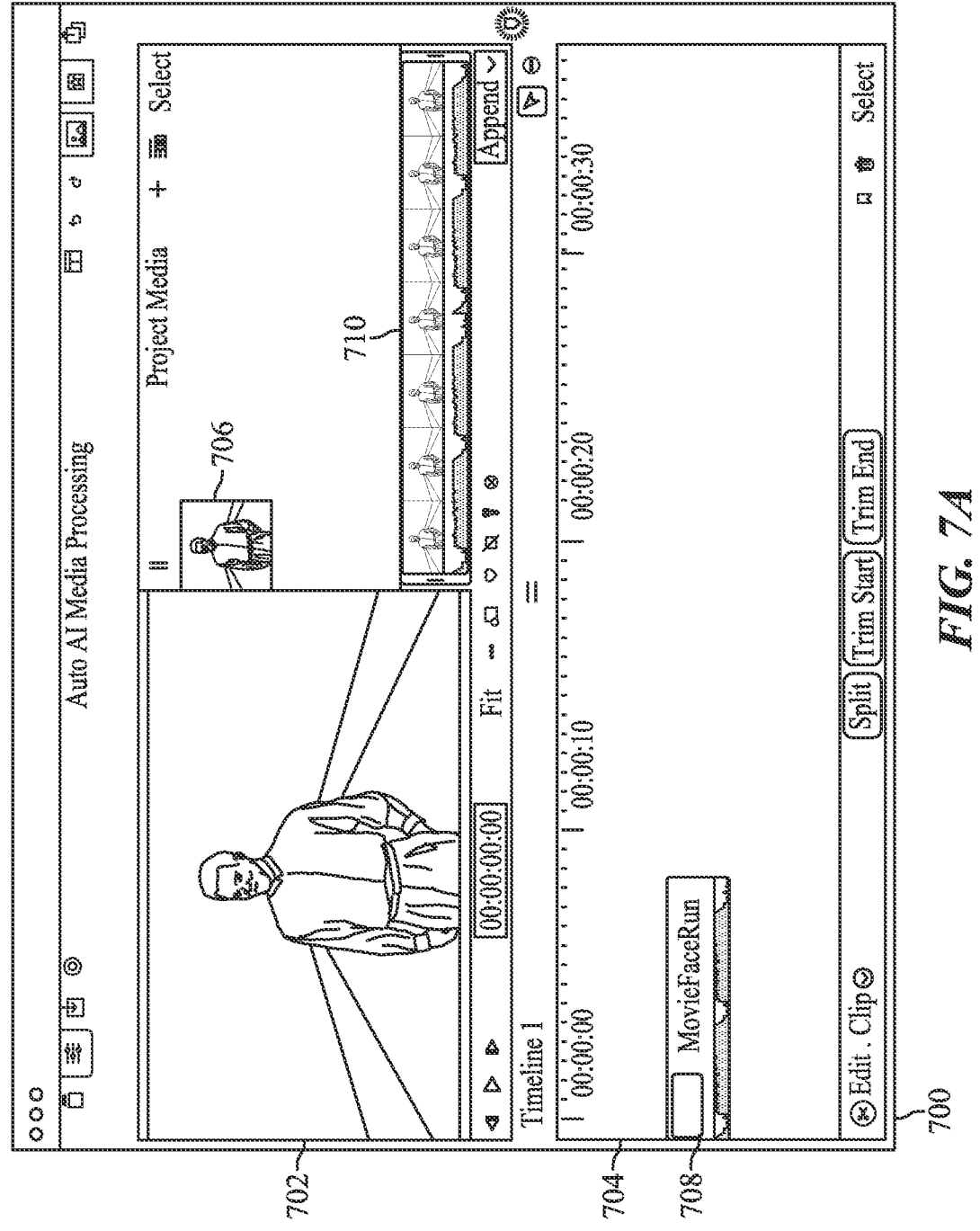
FIGS. 7A-7F show example user interfaces for cropping an original video using a machine learning model, in one or more embodiments.

In FIG. 7A, an example user interface 700 is shown that includes a main display area 702 showing a current frame of a media composition, a timeline 704, a media details control 710, and a project media display area 706. On the timeline 704, the media composition is shown having a single media clip 708 titled "MovieFaceRun." The main display area 702 may be playing back the media composition in one approach, or a single frame may be shown while the media composition remains paused.

Figure 7B:
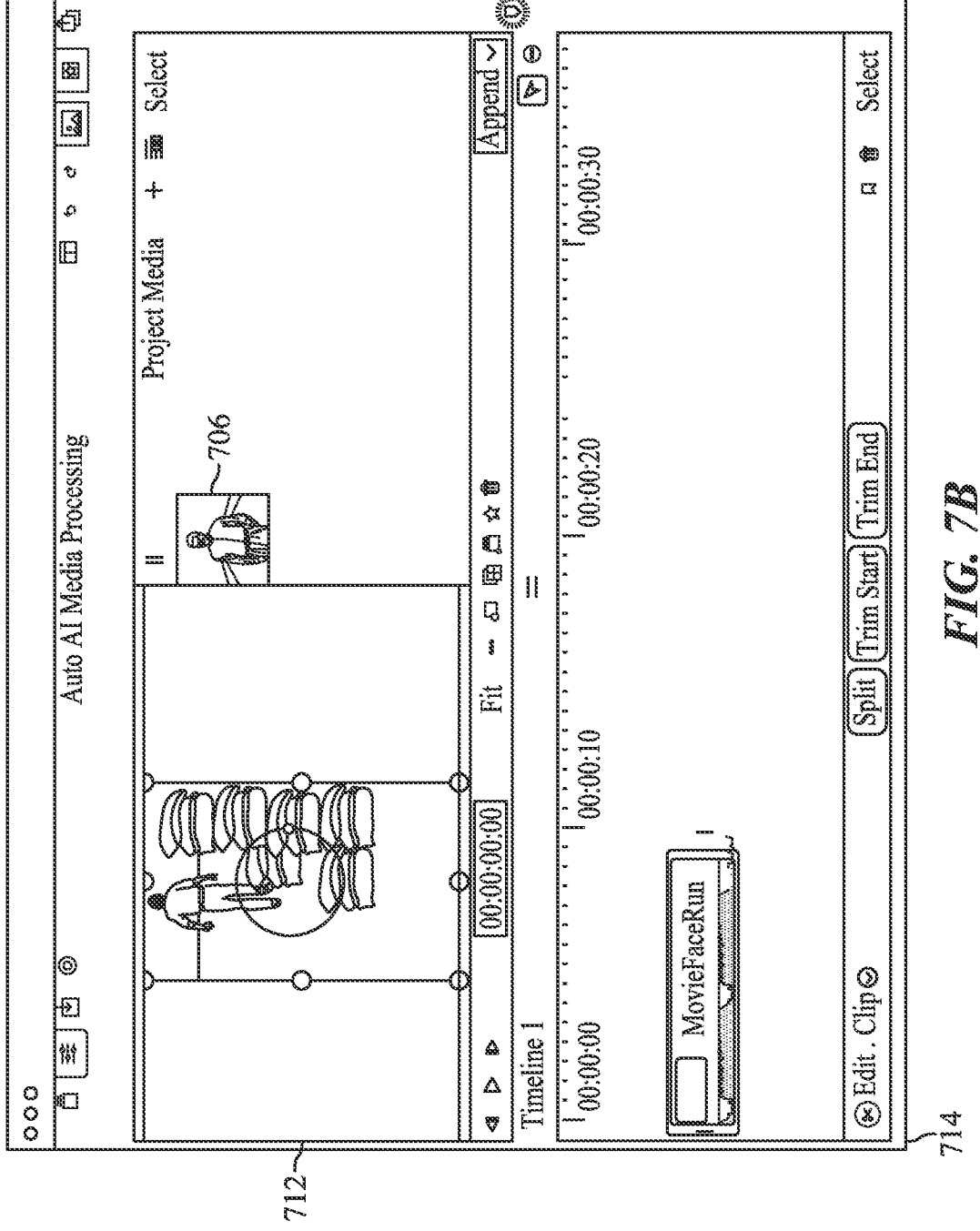

FIG. 7B shows a user interface 714 where the user is provided with the ability to manually crop the media clip 708. The user interface 714 shows an adjustable frame on the current frame of the media composition in display area 712. The adjustable frame depicts a potential cropped image size, along with alignment indicators at center and axis points on each side of the frame. A circle is located in the middle of the frame indicating where a main target of the frame will be most noticeable. The user may use this adjustable frame to indicate how to crop the current frame of the media composition shown in the display area 712, in one approach.

Figure 7C:
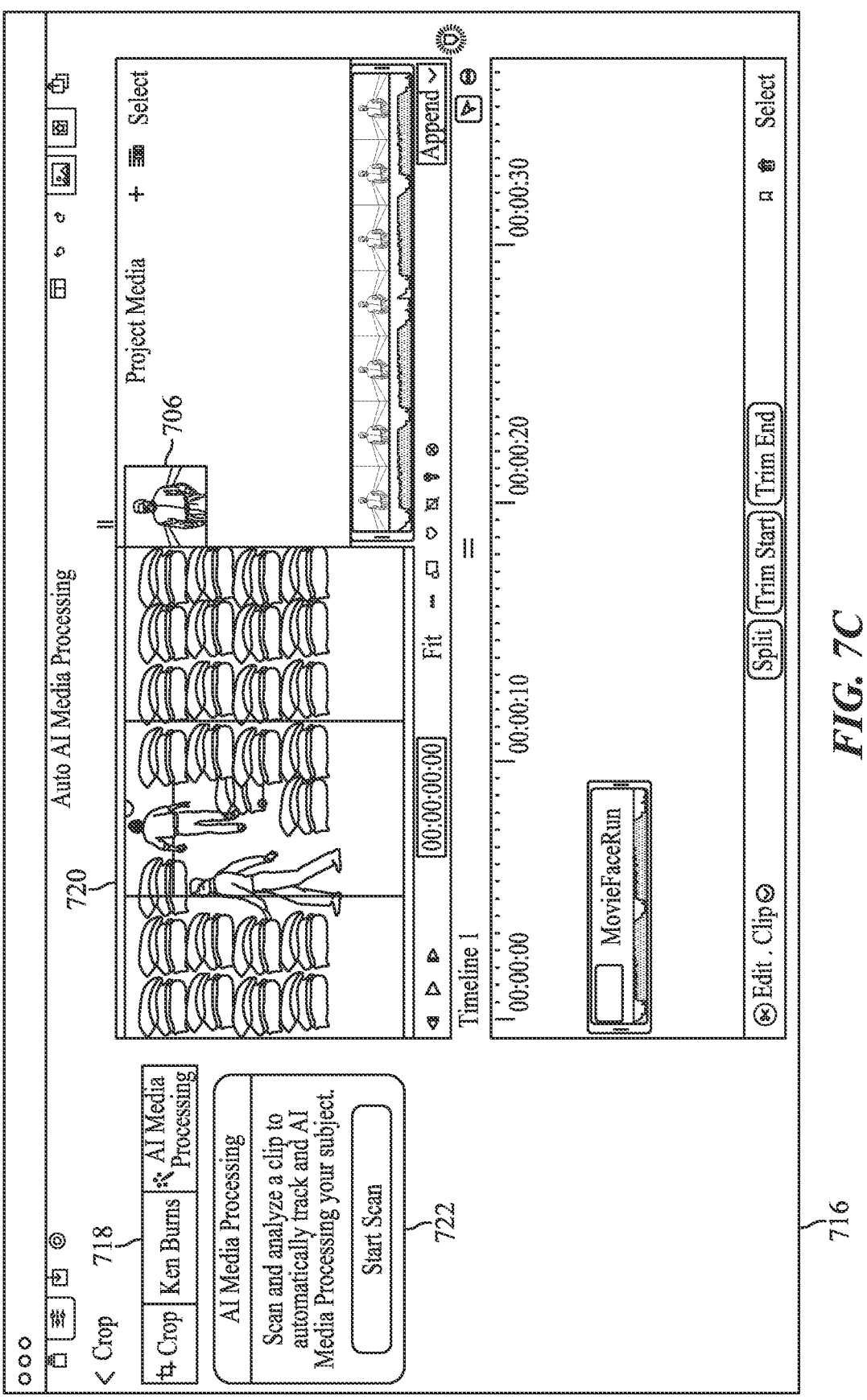

FIG. 7C shows a user interface 716 where an interface element 718 is shown that includes several selectable tools, e.g., "Crop," "Ken Burns," and "AI Media Processing." Selecting one of these selectable tools causes the tool or routine to launch. The main display area 720 now shows the original media clip with one or more overlaid gridlines indicating where potential cropping may take place. When the AI media processing routine tool is selected, a second interface element 722 is displayed which indicates that a scan of the media clip will be automatically performed to determine how best to crop the material to track a subject in the field of view.

Some other options may be available for automatic cropping, such as to remove unwanted visuals, remove/avoid lower quality video portions, etc. If the user selects the option to perform the scan, the AI media processing routine will execute on the selected media frame/clip.

Figure 7D:
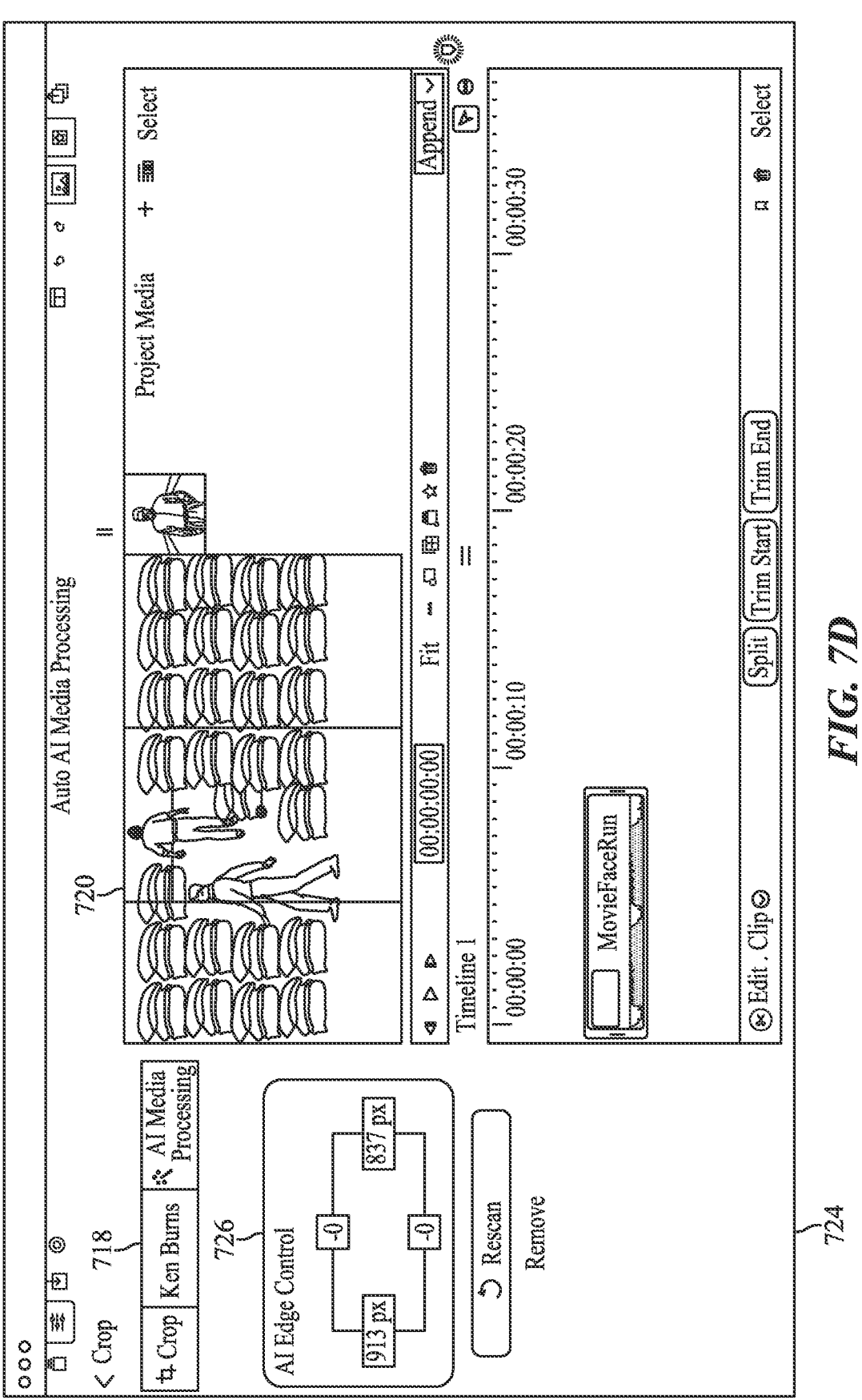

FIG. 7D shows a user interface 724 where the AI media processing routine has been performed, with an interface element 726 that allows for minor adjustments, rescanning, and removal of the AI-generated cropping. Pixel-level adjustments may be made to the cropping performed on the current frame using the interface element 726.

Figure 7E:
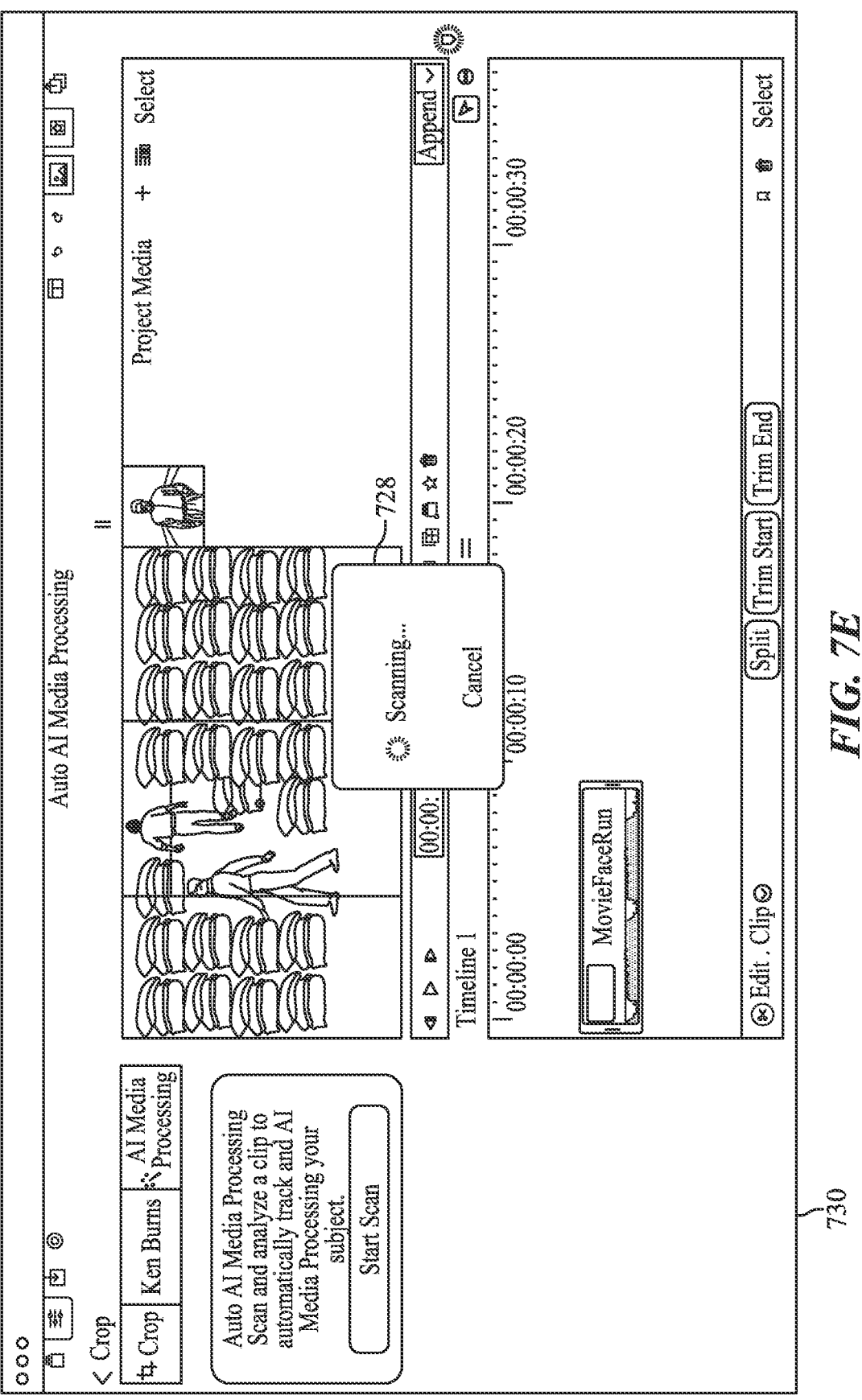

FIG. 7E shows a user interface 730 where the AI media processing routine is running the scan (indicated by interface element 728), either in response to initial selection by the user, or a request for a rescan. This interface element 728 may be displayed while the scan is performed, and be removed once the scan has completed. The scan may be canceled by selecting the "Cancel" button.

Figure 7F:
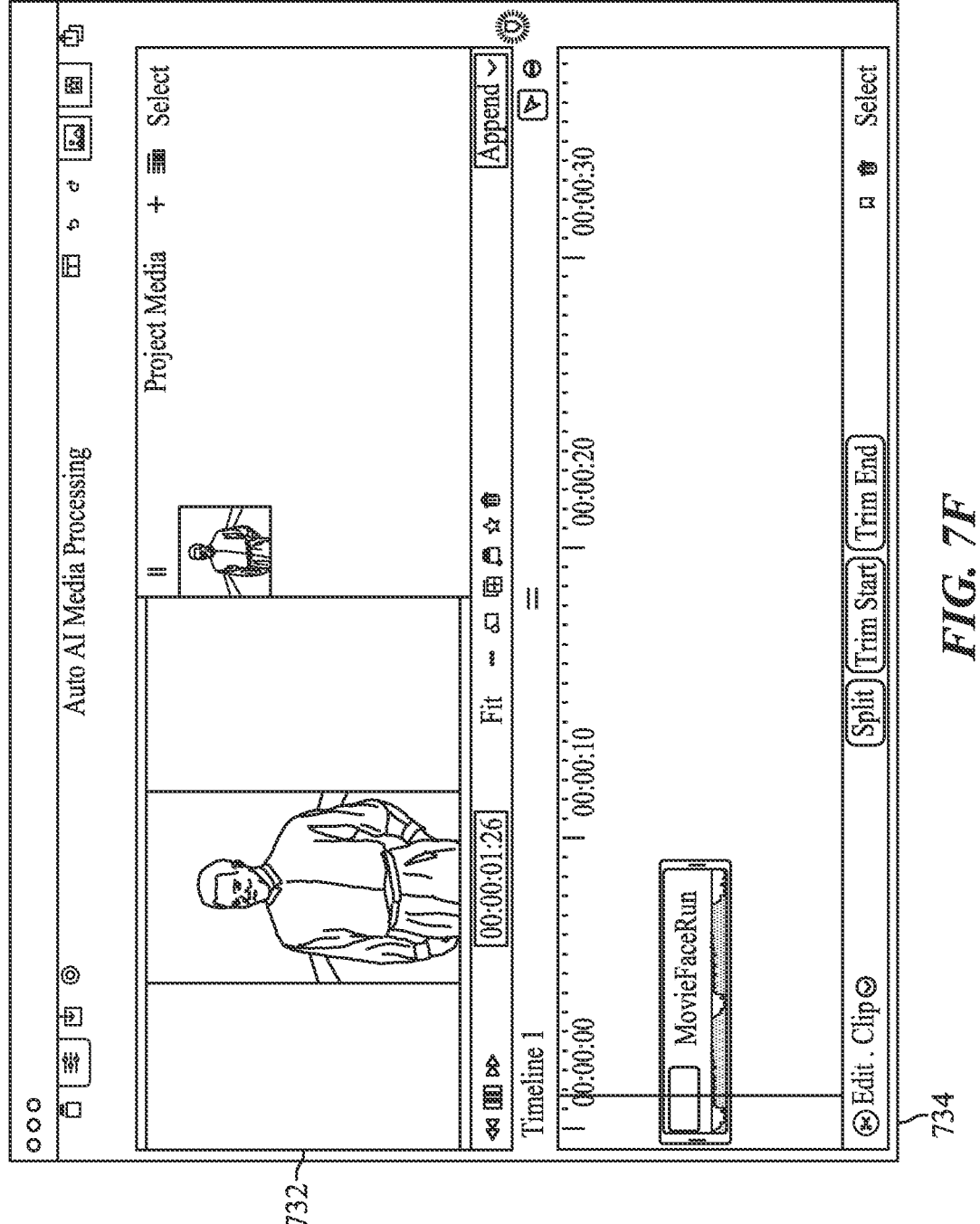

FIG. 7F shows a user interface 734 where the cropped media clip is displayed in the main display area 732 after performing the AI media processing routine. As can be seen, the aspect ratio of the frame in the main display area 732 is cropped to remove content on the sides of the frame in relation to the frame shown in user interface 700 of FIG. 7A.

FIGS. 8A-8D show example user interfaces for generating a merged media composition, in one or more embodiments.

Figure 8A:
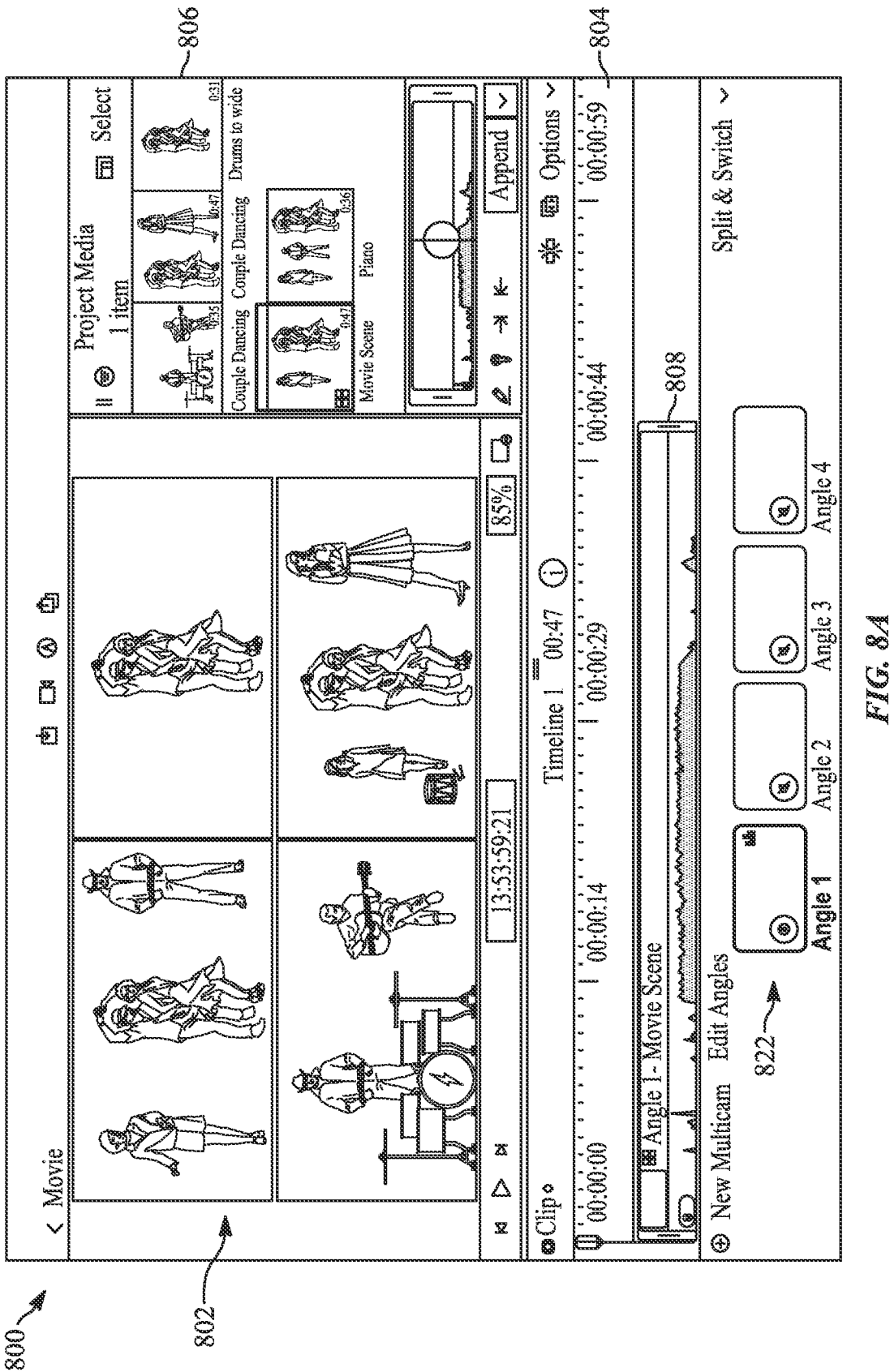
FIGS. 8A-8D show example user interfaces for generating a merged media composition, in one or more embodiments.

In FIG. 8A, a user interface 800 is shown that includes a main display area 802, a timeline 804, a project media display area 806, and a multicam editing control 822.

On the timeline 804, the media composition is shown having a single media clip 808 titled "Angle 1—Move Scene." The multicam editing control 822 indicates that there are four angles available for inclusion in the media composition: "Angle 1," "Angle 2," "Angle 3," and "Angle 4."

In the main display area 802, all four available angles are shown in a multi-angle view that allows a user to see what is occurring from each angle at any given time, controllable through the playhead indicator on the timeline.

Figure 8B:
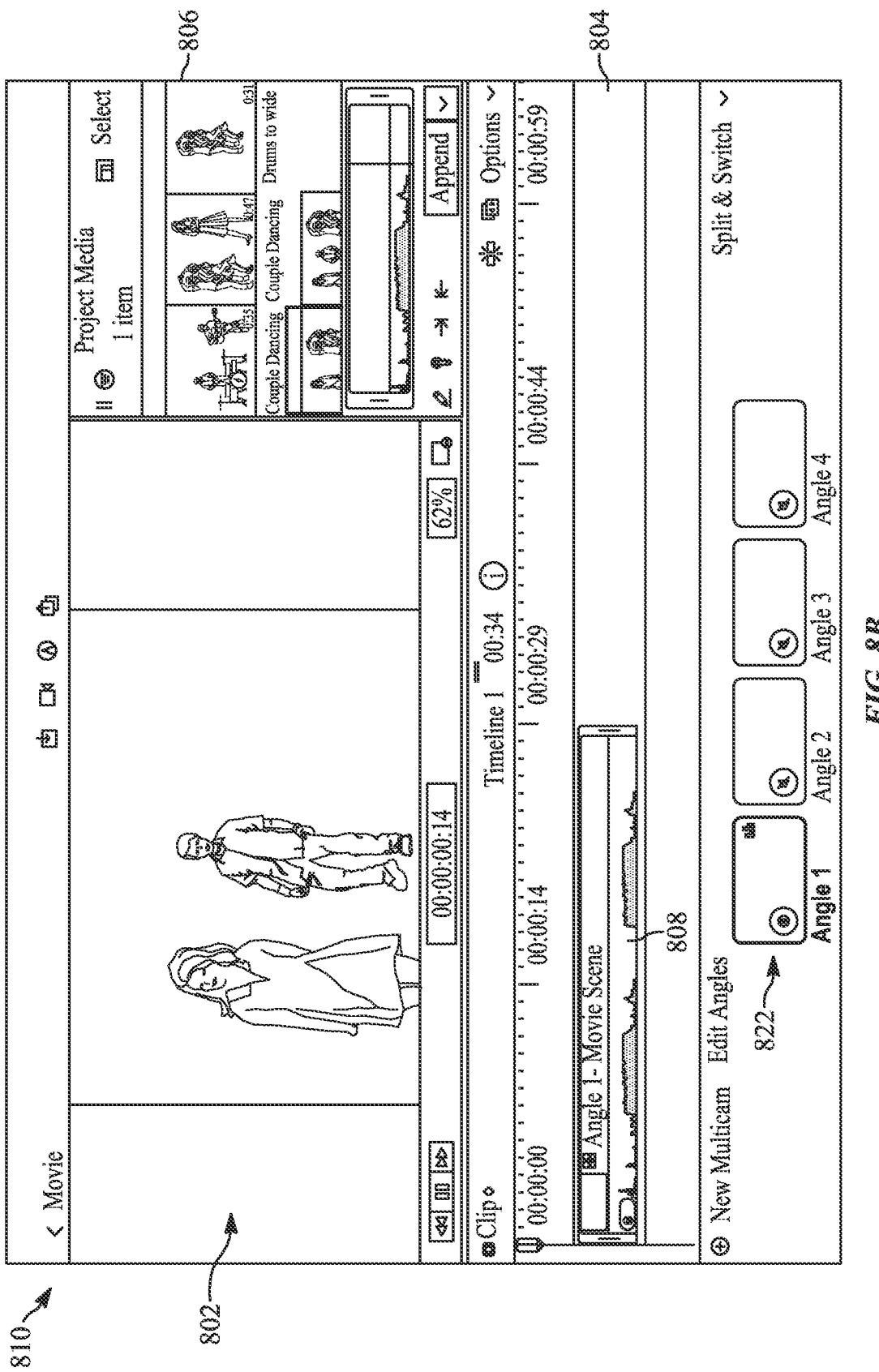

FIG. 8B shows a user interface 810 where the user has trimmed a length of media clip 808, such that it now ends at time 0:29 instead of 0:46 as in FIG. 8A. Moreover, main display area 802 is now showing a frame from media clip 808. A user may add a media clip to the media composition by selecting the corresponding angle from multicam editing control 822 during playback of the media composition at a time when the user wants to insert the content of the selected media clip.

Figure 8C:
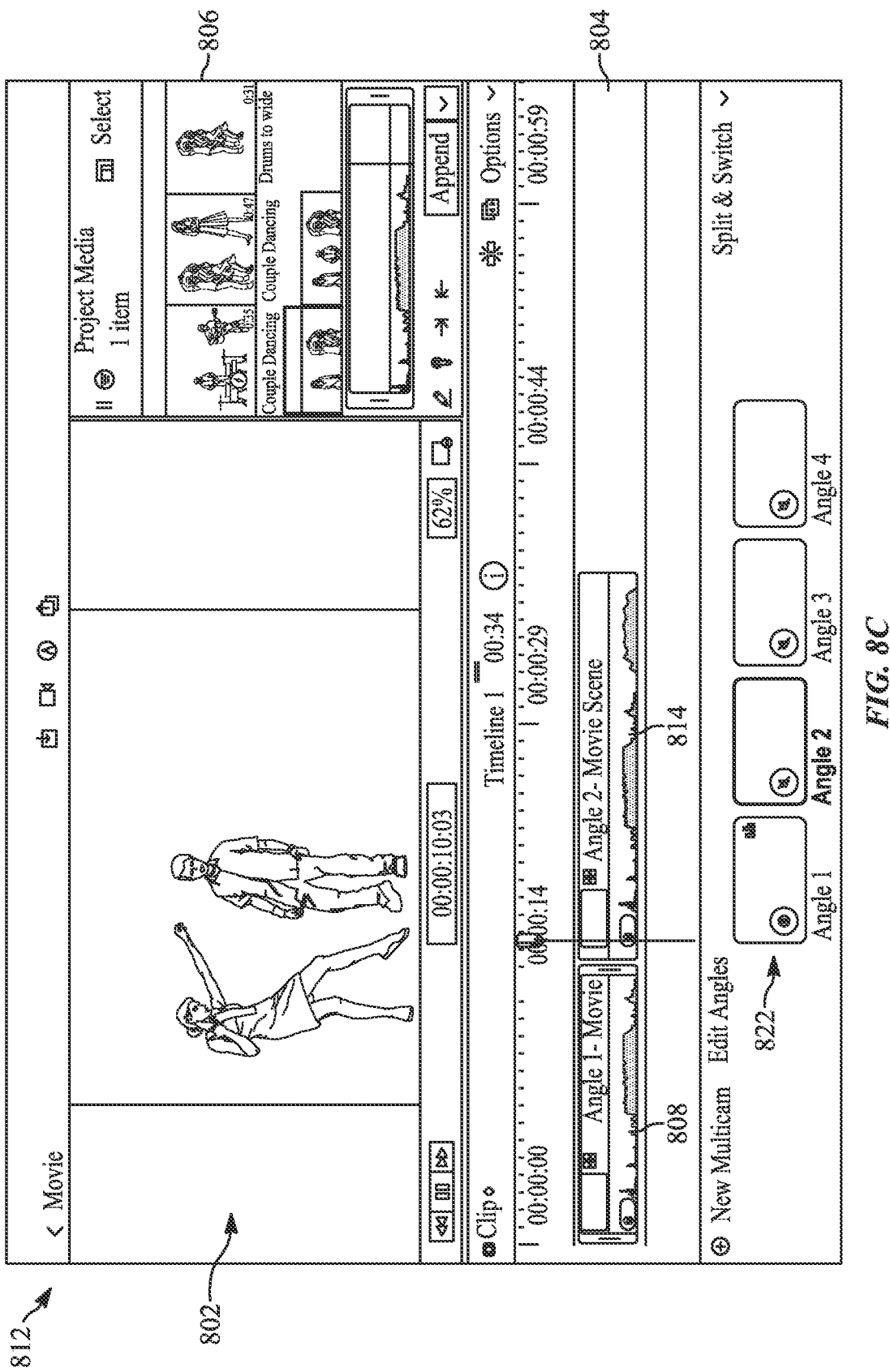

In FIG. 8C, user interface 812 shows that a second media clip 814 has been added to the media composition at the 0:14 mark, thereby further trimming the length of media clip 808 from ending at 0:29 to ending at 0:14. Playback of the media composition is shown in the main display area 802 at the current time index of 0:10:03, indicating that a frame of media clip 814 is being shown in the main display area 802. The user may add more media clips to the media composition through use of the multicam editing control 822 as playback of the media composition continues, or by selecting a different thumbnail image from the project media display area 806.

Figure 8D:
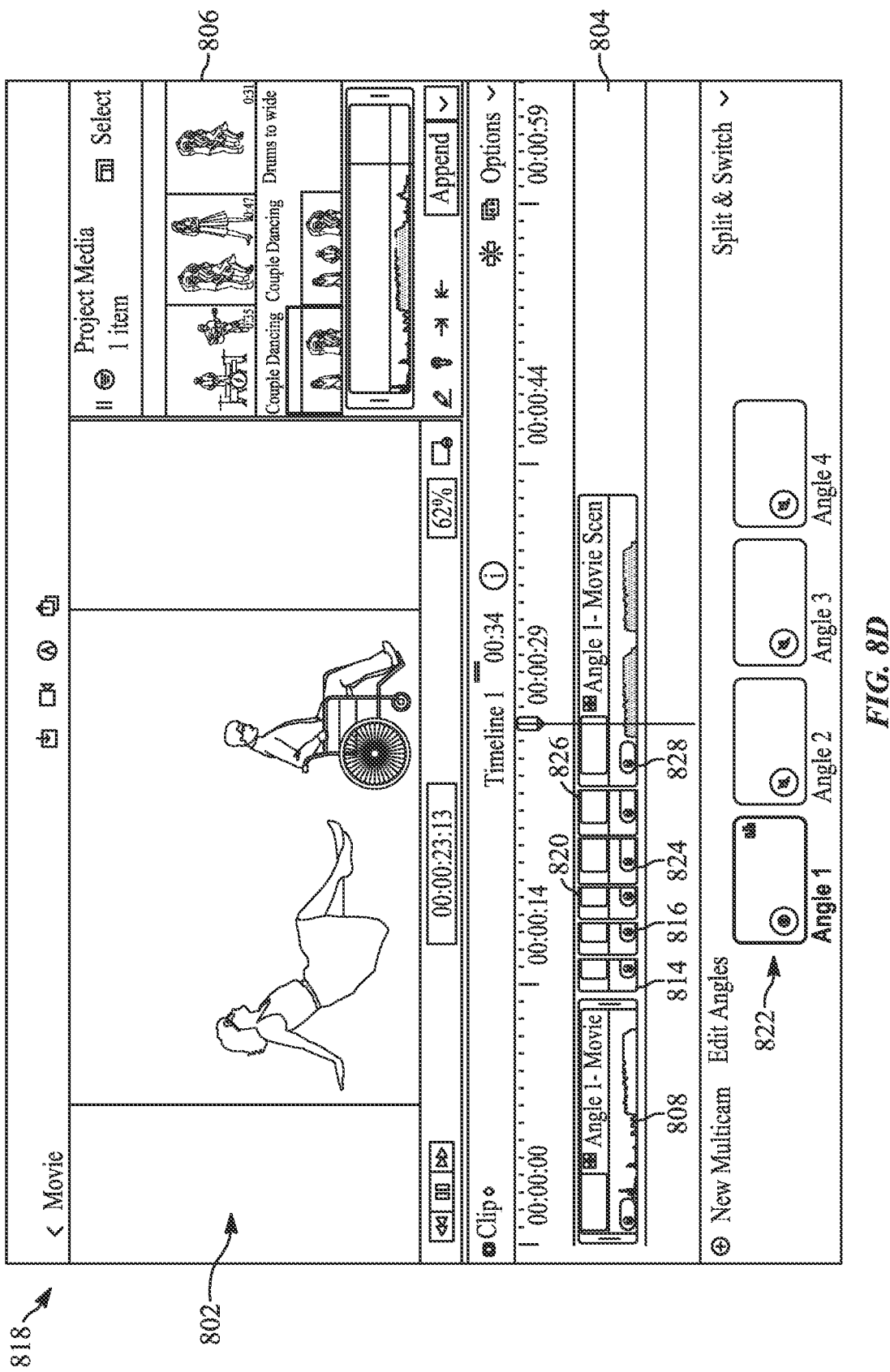

In FIG. 8D, user interface 818 shows multiple additional media clips have been inserted into the media composition at various time marks. Media clip 816 starts at about the 0:16 mark, followed by media clip 820, media clip 824, media clip 826, and media clip 828 which ends at the 0:42 mark. This illustrates how a user may construct a merged media composition from a set of media clips that capture video of a common environment from multiple angles.

Merged Media Composing Embodiments

In various embodiments a merged media composition may be generated as described below.

1. A non-transitory computer readable medium comprising one or more sequences of instructions which, when executed by one or more hardware processors, cause the one or more processors to perform operations comprising:

receiving a target original video;

receiving user input specifying one or more modification rules for generating a target modified video based on the target original video; and applying the one or more modification rules to the target original video to generate the target modified video, wherein one or more frames from the target original video are cropped to generate corresponding frames in the target modified video.

2. A non-transitory computer readable medium comprising one or more sequences of instructions which, when executed by one or more hardware processors, cause the one or more processors to perform operations comprising:

concurrently displaying: (a) a plurality of media streams, a video stream of each media stream showing a same environment from a different respective perspective, and (b) a merged media composition showing the environment;

receiving a first selection of a first interface element corresponding to a first stream of the plurality of media streams;

determining a first time associated with the first selection;

generating a first portion of the merged media composition using the first stream as a source stream for a first time period beginning at the first time;

receiving a second selection of a second interface element corresponding to a second stream of the plurality of media streams;

determining a second time associated with the second selection; and generating a second portion of the merged media composition using the second stream as a source stream for a second time period beginning at the second time.

3. The non-transitory computer readable medium as recited in claim 2, wherein the operations further comprise:

receiving a third selection of a third interface element corresponding to an audio portion of a third stream of the plurality of media streams;

determining a third time associated with the third selection; and generating a third portion of the merged media composition for a third time period beginning at the third time using: (a) a video portion of the second stream, and (b) the audio portion of the third stream.

4. The non-transitory computer readable medium as recited in claim 2, wherein the operations further comprise:

displaying one or more interface elements that allow for selection of: (a) only an audio stream, (b) only a video stream, and (c) a combined audio-video stream;

receiving a selection of the one or more interface elements selecting one of: (a) only the audio stream, (b) only the video stream, or (c) the combined audio-video stream;

receiving a third selection of a third stream of the plurality of media streams;

determining a third time associated with the third selection;

generating a third portion of the merged media composition using a selected portion of the third stream as a source stream for the merged media composition for a third time period beginning at the third time, the selected portion corresponding to one of: (a) only the audio stream, (b) only the video stream, or (c) the combined audio-video stream.

5. The non-transitory computer readable medium as recited in claim 2, wherein the operations further comprise: concurrently with displaying (a) the plurality of media streams, and (b) the merged media composition: displaying a timeline, wherein display of each of the plurality of media streams and the merged media composition are time-synchronized to a time associated with a playhead movable along the timeline.

6. The non-transitory computer readable medium as recited in claim 2, wherein the operations further comprise: prior to concurrently displaying (a) the plurality of media streams and (b) the merged media composition: identifying an audio portion of each of the plurality of media streams; and time-synchronizing the plurality of media streams based on a comparison of the audio portion of each of the plurality of the media streams.

7. A system comprising:
one or more processors; and
a non-transitory computer readable medium comprising one or more sequences of instructions which, when executed by the one or more processors, cause the one or more processors to perform operations comprising:
concurrently displaying: (a) a plurality of media streams, a video stream of each media stream showing a same environment from a different respective perspective, and (b) a merged media composition showing the environment;
receiving a first selection of a first interface element corresponding to a first stream of the plurality of media streams;
determining a first time associated with the first selection;
generating a first portion of the merged media composition using the first stream as a source stream for a first time period beginning at the first time;
receiving a second selection of a second interface element corresponding to a second stream of the plurality of media streams;
determining a second time associated with the second selection; and
generating a second portion of the merged media composition using the second stream as a source stream for a second time period beginning at the second time.

8. A method comprising:
concurrently displaying: (a) a plurality of media streams, a video stream of each media stream showing a same environment from a different respective perspective, and (b) a merged media composition showing the environment;
receiving a first selection of a first interface element corresponding to a first stream of the plurality of media streams;
determining a first time associated with the first selection;
generating a first portion of the merged media composition using the first stream as a source stream for a first time period beginning at the first time;
receiving a second selection of a second interface element corresponding to a second stream of the plurality of media streams;
determining a second time associated with the second selection; and generating a second portion of the merged media composition using the second stream as a source stream for a second time period beginning at the second time.

Privacy

As described above, one aspect of the present technology is the gathering and use of data available from various sources to improve the machine learning model to provide video modification more relevant to the user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to generate cropped videos, zoomed videos, and/or merged media compositions based on user preferences gleaned from the personal information data. Accordingly, use of such personal information data enables users to control how the videos are cropped, zoomed, and/or merged. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of video modification and/or media composition services, the present technology can be configured to allow users to select to "opt in" or "opt out" of participation in the collection of personal information data during registration for services or anytime thereafter. In another example, users can select not to provide mood-associated data for video modification and/or media composition services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, original videos can be cropped, original videos can be zoomed, and/or different perspectives of an environment can be merged into a media composition based on non-personal information data or a bare minimum amount of personal information, such as the content being requested by the device associated with a user, other non-personal information available to the video modification services, or publicly available information.

Example System Architecture

Figure 9:
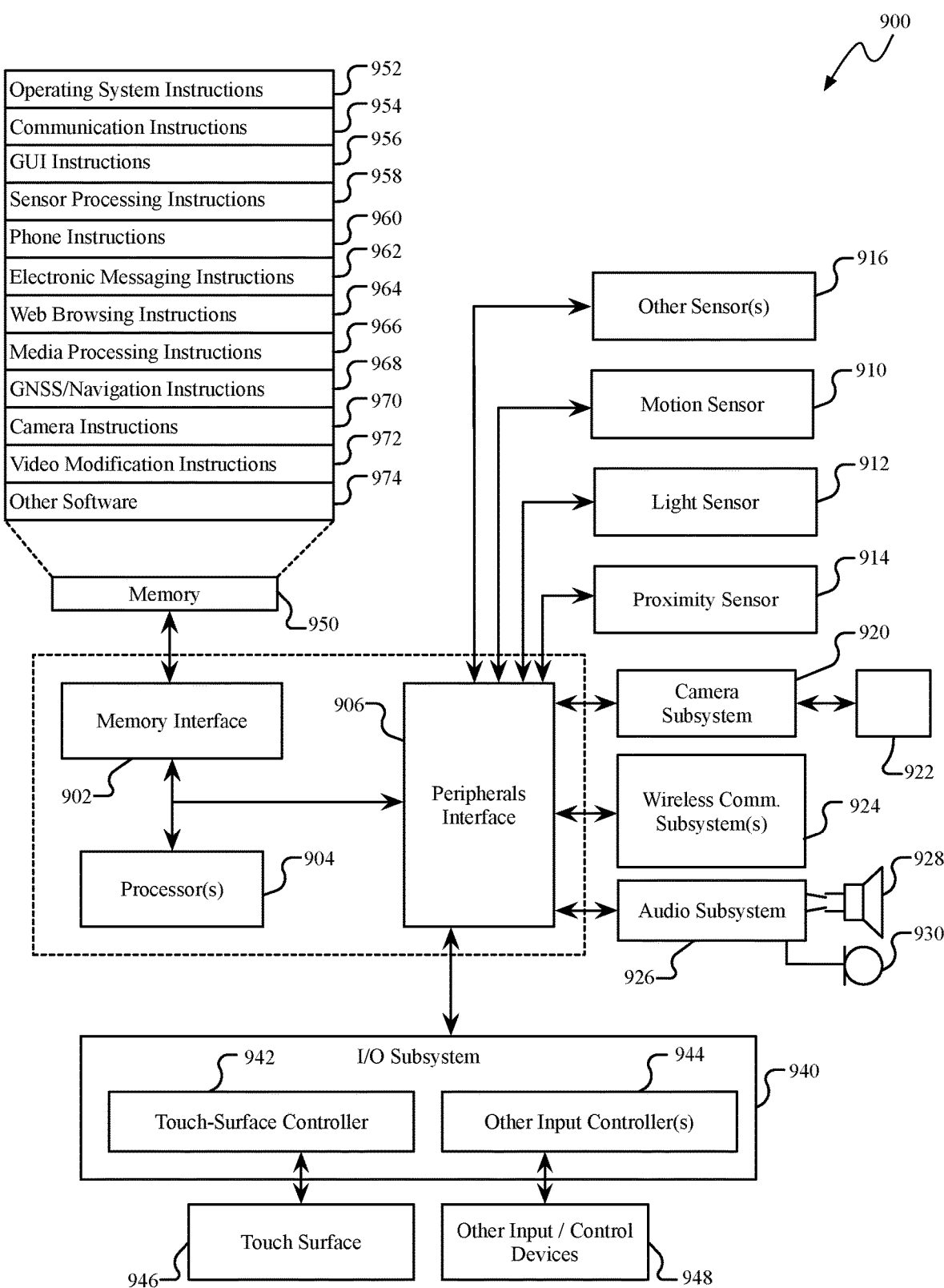
FIG. 9 is a block diagram of an example computing device that can implement the features and processes of FIGS. 1-8D.

FIG. 9 is a block diagram of an example computing device 900 that can implement the features and processes of FIGS. 1-8D. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the computing device 900 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™.

The memory interface 902 can be coupled to memory 950. The memory 950 can include high-speed random-access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as Vx Works.

The operating system 952 can include instructions for handling basic system services and for performing hardware dependent tasks. In some implementations, the operating system 952 can be a kernel (e.g., UNIX kernel). In some implementations, the operating system 952 can include instructions for performing video modification. For example, operating system 952 can implement the video modification features as described with reference to FIGS. 1-8D.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store software instructions 972 to facilitate other processes and functions, such as the video modification processes and functions as described with reference to FIGS. 1-8D.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A non-transitory computer readable medium comprising one or more sequences of instructions which, when executed by one or more processors, cause the one or more processors to perform operations comprising:

obtaining a plurality of training data sets, wherein each particular training data set in the plurality of training data sets comprises:

an original video; and a modified video, wherein a first plurality of frames from the original video are modified to generate corresponding frames in the modified video;

training a machine learning model, using the plurality of training data sets, to generate modified videos from original videos such that one or more frames in the original videos are modified to generate corresponding frames in respective modified videos;

obtaining a target original video; and applying the trained machine learning model to the target original video to generate a target modified video, wherein applying the trained machine learning model to the target original video comprises:

identifying a second plurality of frames of the target original video;

modifying each of the second plurality of frames to generate a modified second plurality of frames; and generating the target modified video based on the modified second plurality of frames.

2. The non-transitory computer readable medium as recited in claim 1:

wherein each particular training data set further comprises modification criteria, wherein the machine learning model is further trained on the modification criteria included in each particular training data set, wherein the operations further comprise receiving a first modification criteria for modifying the target original video, and wherein the trained machine learning model is applied to the target original video based on the first modification criteria.

3. The non-transitory computer readable medium as recited in claim 2, wherein the first modification criteria indicates a target aspect ratio for the target modified video.

4. The non-transitory computer readable medium as recited in claim 3, wherein the first modification criteria further indicates a source aspect ratio for the target original video.

5. The non-transitory computer readable medium as recited in claim 1:

wherein each particular training data set further comprises metadata associated with the original video, the metadata identifying one or more attributes of the original video, wherein the machine learning model is further trained on the metadata included in each particular training data set, wherein the operations further comprise receiving first metadata associated with the target original video, and wherein the trained machine learning model is applied to the target original video based on the first metadata associated with the target original video.

6. The non-transitory computer readable medium as recited in claim 1, wherein the target modified video has a different aspect ratio than the target original video based on applying the trained machine learning model to the target original video.

7. The non-transitory computer readable medium as recited in claim 1, wherein modifying each of the second plurality of frames comprises executing zooming and/or cropping operations on each of the second plurality of frames.

8. A system comprising:
one or more processors; and
a non-transitory computer readable medium comprising one or more sequences of instructions which, when executed by the one or more processors, cause the one or more processors to perform operations comprising:
obtaining a plurality of training data sets, wherein each particular training data set in the plurality of training data sets comprises:
an original video; and
a modified video, wherein a first plurality of frames from the original video are modified to generate corresponding frames in the modified video;
training a machine learning model, using the plurality of training data sets, to generate modified videos from original videos such that one or more frames in the original videos are modified to generate corresponding frames in respective modified videos;
obtaining a target original video; and
applying the trained machine learning model to the target original video to generate a target modified video, wherein applying the trained machine learning model to the target original video comprises:
identifying a second plurality of frames of the target original video;
modifying each of the second plurality of frames to generate a modified second plurality of frames; and
generating the target modified video based on the modified second plurality of frames.

9. The system as recited in claim 8:
wherein each particular training data set further comprises modification criteria,
wherein the machine learning model is further trained on the modification criteria included in each particular training data set,
wherein the operations further comprise receiving a first modification criteria for modifying the target original video, and
wherein the trained machine learning model is applied to the target original video based on the first modification criteria.

10. The system as recited in claim 9, wherein the first modification criteria indicates a target aspect ratio for the target modified video.

11. The system as recited in claim 10, wherein the first modification criteria further indicates a source aspect ratio for the target original video.

12. The system as recited in claim 8:
wherein each particular training data set further comprises metadata associated with the original video, the metadata identifying one or more attributes of the original video,
wherein the machine learning model is further trained on the metadata included in each particular training data set,
wherein the operations further comprise receiving first metadata associated with the target original video, and
wherein the trained machine learning model is applied to the target original video based on the first metadata associated with the target original video.

13. The system as recited in claim 8, wherein the target modified video has a different aspect ratio than the target original video based on applying the trained machine learning model to the target original video.

14. A method comprising:
obtaining a plurality of training data sets, wherein each particular training data set in the plurality of training data sets comprises:
an original video; and
a modified video, wherein a first plurality of frames from the original video are modified to generate corresponding frames in the modified video;
training a machine learning model, using the plurality of training data sets, to generate modified videos from original videos such that one or more frames in the original videos are modified to generate corresponding frames in respective modified videos;
obtaining a target original video; and
applying the trained machine learning model to the target original video to generate a target modified video, wherein applying the trained machine learning model to the target original video comprises:
identifying a second plurality of frames of the target original video;
modifying each of the second plurality of frames to generate a modified second plurality of frames; and
generating the target modified video based on the modified second plurality of frames.

15. The method as recited in claim 14:
wherein each particular training data set further comprises modification criteria,
wherein the machine learning model is further trained on the modification criteria included in each particular training data set,
wherein the method further comprises receiving a first modification criteria for modifying the target original video, and
wherein the trained machine learning model is applied to the target original video based on the first modification criteria.

16. The method as recited in claim 15, wherein the first modification criteria indicates a target aspect ratio for the target modified video.

17. The method as recited in claim 16, wherein the first modification criteria further indicates a source aspect ratio for the target original video.

18. The method as recited in claim 14:
wherein each particular training data set further comprises metadata associated with the original video, the metadata identifying one or more attributes of the original video,
wherein the machine learning model is further trained on the metadata included in each particular training data set,
wherein the method further comprises receiving first metadata associated with the target original video, and
wherein the trained machine learning model is applied to the target original video based on the first metadata associated with the target original video.

19. The method as recited in claim 14, wherein the target modified video has a different aspect ratio than the target original video based on applying the trained machine learning model to the target original video.

* * * * *